US012621204B2

(12) United States Patent
Li et al.

(10) Patent No.: US 12,621,204 B2
(45) Date of Patent: May 5, 2026

(54) METHOD AND APPARATUS FOR OBTAINING MANAGEMENT DATA

(71) Applicant: Huawei Technologies Co., Ltd., Shenzhen (CN)

(72) Inventors: Zhuoming Li, Xi'an (CN); Lei Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1124 days.

(21) Appl. No.: 17/667,084

(22) Filed: Feb. 8, 2022

(65) Prior Publication Data

US 2022/0166664 A1 May 26, 2022

Related U.S. Application Data

(63) Continuation of application No. PCT/CN2020/100932, filed on Jul. 8, 2020.

(30) Foreign Application Priority Data

Aug. 8, 2019 (CN) .......................... 201910730071.X

(51) Int. Cl.
*H04L 41/00* (2022.01)
*H04L 41/0246* (2022.01)
(Continued)

(52) U.S. Cl.
CPC ...... *H04L 41/0686* (2013.01); *H04L 41/0246* (2013.01); *H04L 41/069* (2013.01); *H04W 24/08* (2013.01)

(58) Field of Classification Search
None
See application file for complete search history.

(56) References Cited

U.S. PATENT DOCUMENTS

2018/0176858 A1    6/2018   Wang et al.
2020/0280493 A1*   9/2020   Xu ...................... H04L 41/0886

FOREIGN PATENT DOCUMENTS

CN        109391505 A    2/2019
CN        109429244 A    3/2019
          (Continued)

OTHER PUBLICATIONS

3GPP TS 23.502 V16.1.1, Jun. 2019, "3rd Generation Partnership Project; Technical Specification Group Services and System Aspects; Procedures for the 5G System; Stage 2 (Release 16)," 494 pages.
(Continued)

*Primary Examiner* — Willie J Daniel, Jr.
(74) *Attorney, Agent, or Firm* — Conley Rose, P.C.

(57) ABSTRACT

A method and apparatus for obtaining management data, where the method includes: a first network element receiving a request message from a second network element, where the request message indicates a tenant identifier and at least one managed object instance, where the tenant identifier corresponds to at least one network slice service identifier; the first network element determining a first managed object instance in the at least one managed object instance based on the network slice service identifier, where the second network element has permission to obtain management data in the first managed object instance; and the first network element obtaining management data corresponding to the network slice service identifier from the first managed object instance.

20 Claims, 10 Drawing Sheets

(51) Int. Cl.
    *H04L 41/0686*     (2022.01)
    *H04L 41/069*     (2022.01)
    *H04W 24/08*     (2009.01)

(56)              References Cited

FOREIGN PATENT DOCUMENTS

| CN | 109525412 A | | 3/2019 | |
|----|-------------|---|--------|---|
| CN | 109525625 A | | 3/2019 | |
| CN | 109547231 A | * | 3/2019 | ............ H04W 28/16 |
| CN | 109873730 A | | 6/2019 | |
| WO | 2018072612 A1 | | 4/2018 | |
| WO | 2019057015 A1 | | 3/2019 | |

OTHER PUBLICATIONS

3GPP TS 28.530 V15.1.0, Dec. 2018, "3rd Generation Partnership Project; Technical Specification Group Services and System Aspects; Management and orchestration; Concepts, use cases and requirements (Release 15)," 28 pages.

3GPP TS 28.532 V16.0.0, Jun. 2019, "3rd Generation Partnership Project; Technical Specification Group Services and System Aspects; Management and orchestration; Generic management services; (Release 16)," 180 pages.

3GPP TS 28.533 V16.0.0, Jun. 2019, "3rd Generation Partnership Project; Technical Specification Group Services and System Aspects; Management and orchestration; Architecture framework (Release 16)," 26 pages.

3GPP TS 28.541 V16.1.0, Jun. 2019, "3rd Generation Partnership Project; Technical Specification Group Services and System Aspects; Management and orchestration; 5G Network Resource Model (NRM); Stage 2 and stage 3 (Release 16)," 240 pages.

3GPP TS 28.550 V16.1.0, Jun. 2019, "3rd Generation Partnership Project; Technical Specification Group Services and System Aspects; Management and orchestration; Performance assurance (Release 16)," 81 pages.

3GPP TS 28.552 V16.2.0, Jun. 2019, "3rd Generation Partnership Project; Technical Specification Group Services and System Aspects; Management and orchestration; 5G performance measurements (Release 16)," 98 pages.

3GPP TS 28.554 V16.1.0, Jun. 2019, "3rd Generation Partnership Project; Technical Specification Group Services and System Aspects; Management and orchestration; 5G end to end Key Performance Indicators (KPI) (Release 16)," 20 pages.

3GPP TS 28.622 V16.0.0, Jun. 2019, "3rd Generation Partnership Project; Technical Specification Group Services and System Aspects; Telecommunication management; Generic Network Resource Model (NRM) Integration Reference Point (IRP); Information Service (IS)(Release 16)," 38 pages.

3GPP TR 28.804 0.5.0, Jun. 2019, "3rd Generation Partnership Project; Technical Specification Group Services and System Aspects; Telecommunication management; Study on tenancy concept in 5G networks and network slicing management (Release 16)," 10 pages.

3GPP TS 32.404 V15.0.0, Jun. 2018, "3rd Generation Partnership Project; Technical Specification Group Services and System Aspects; Telecommunication management; Performance Management (PM); Performance measurements; Definitions and template (Release 15)," 34 pages.

Huawei, "pCR Representation of tenant in 3GPP management system," 3GPP TSG-SA5 Meeting #125, S5-193475, Newport Beach, US, Apr. 8-12, 2019, 3 pages.

Huawei, "Use case of management capability for tenant," 3GPP TSG-SA5 Meeting #125 Ad-hoc, S5-194479, Jun. 25-28, 2019, Sapporo, Japan, 2 pages.

Huawei, "Add managed data isolation concept," 3GPP TSG-SA5 Meeting #124, S5-192407, Taipei, Taiwan, Feb. 25-Mar. 1, 2019, 2 pages.

Huawei, "Change NRM for network slice priority support", 3GPP TSG-SAS Meeting #122 S5-187193, Spokane, US, Nov. 12-16, 2018, 5 pages.

"3rd Generation Partnership Project; Technical Specification Group Services and System Aspects; Management and orchestration; Management services (Release 15)", 3GPP Draft; 28.XYZ 000, XP051542857, Jul. 13, 2018, 167 pages.

* cited by examiner

METHOD AND APPARATUS FOR OBTAINING MANAGEMENT DATA

CROSS REFERENCE TO RELATED APPLICATIONS

This is a continuation of International Patent Application No. PCT/CN2020/100932, filed on Jul. 8, 2020, which claims priority to Chinese Patent Application No. 201910730071.X, filed on Aug. 8, 2019. The disclosures of the aforementioned applications are hereby incorporated by reference in their entireties.

TECHNICAL FIELD

This disclosure relates to the field of mobile communications technologies, and in particular, to a method and an apparatus for obtaining management data.

BACKGROUND

As various communications services are emerging, different communications services have significantly different requirements for network performance. A network slice is introduced into a $5^{th}$ generation (5G) communications system to meet differentiated requirements of the different communications services for network performance. The network slice refers to customizing a logical network on a physical or virtual network infrastructure, according to different service requirements. The network slice may be a complete end-to-end network including a terminal device, an access network, a transmission network, a core network, and an application server, and can provide a complete communication service.

Generally, different network slices have different network performance requirements. After an operator divides a communications network into a series of network slices, the network slices are logically isolated from each other and have different network features. Different customers can subscribe to a plurality of network slices from the operator, in this way, a physical network of the operator can meet differentiated requirements of different applications for network.

Because a network slice instance is a relatively isolated logical network, the operator usually opens a part of management data to a tenant (for example, another operator) based on a service requirement. For example, the operator allows the tenant to obtain part of network performance results or part of alarm information, such that the tenant learns a network slice running status and facilitates the tenant to develop its own business.

Currently, there is no good method to control the tenant to obtain management data within a reasonable range.

SUMMARY

This disclosure provides a method and apparatus for obtaining management data, to enable a tenant to obtain management data within a proper range.

According to a first aspect, this disclosure provides a method for obtaining management data. The method includes: A first network element receives a request message from a second network element, where the request message indicates a tenant identifier and at least one managed object instance, and the tenant identifier corresponds to at least one network slice service identifier; the first network element determines a first managed object instance in the at least one managed object instance based on the network slice service identifier, where the second network element has permission to obtain management data of the first managed object instance; the first network element obtains management data corresponding to the network slice service identifier from the first managed object instance; and the first network element sends the obtained management data to the second network element. According to this solution, upon requesting to obtain management data, the second network element obtains management data at a network slice service identifier granularity, to be more specific, obtains management data related to a slice service subscribed by a tenant, such that data isolation between different tenants is implemented and data security and privacy is facilitated.

In a possible implementation method, that the first network element determines a first managed object instance in the at least one managed object instance based on the network slice service identifier includes: For any one managed object instance in the at least one managed object instance, if the first network element determines that an attribute of the any one managed object instance includes the network slice service identifier, determining that the any one managed object instance is the first managed object instance.

In a possible implementation method, the first network element obtains the attribute of each managed object instance in the at least one managed object instance from a database.

In a possible implementation method, the tenant identifier is the at least one network slice service identifier. Alternatively, the first network element obtains the at least one network slice service identifier corresponding to the tenant identifier based on the tenant identifier from a third network element, where the third network element is the first network element, the second network element, or the database.

In a possible implementation method, the at least one managed object instance includes one or more of the following items: a network function, a network slice instance, or a subnet slice instance.

In a possible implementation method, the request message includes the tenant identifier and information of the at least one managed object instance, and the request message is used to request to create a performance measurement task. That the first network element obtains management data corresponding to the network slice service identifier from the first managed object instance includes: The first network element sets a measurement sub-item for the performance measurement task corresponding to the first managed object instance based on the network slice service identifier, and creates the performance measurement task; and the first network element receives a performance measurement result corresponding to the performance measurement task from the first managed object instance, where the performance measurement result is management data of the measurement sub-item.

In a possible implementation method, the first network element sends a response message to the second network element, where the response message includes a second managed object instance in the at least one managed object instance, and where the second network element does not have permission to obtain management data of the second managed object instance.

In a possible implementation method, the request message is used to request to create an alarm information subscription task, the request message further indicates a first filter parameter, and the first filter parameter is used to determine alarm information of the at least one managed object instance. That the first network element obtains management data corresponding to the network slice service identifier from the first managed object instance includes: The first network element determines a second filter parameter based on the network slice service identifier and the first filter parameter, and creates the alarm information subscription task, where the alarm information subscription task corresponds to the second filter parameter, and where the second filter parameter is used to obtain alarm information corresponding to the network slice service identifier in the first managed object instance. Additionally, the first network element receives the alarm information corresponding to the alarm information subscription task from the first managed object instance, and the alarm information is the management data.

In a possible implementation method, the request message is used to request to query alarm information, the request message further indicates a first filter parameter, and the first filter parameter is used to determine alarm information of the at least one managed object instance. That the first network element obtains management data of the network slice service corresponding to the network slice service identifier from the first managed object instance includes: The first network element determines a second filter parameter based on the network slice service identifier and the first filter parameter; and the first network element obtains the alarm information corresponding to the network slice service identifier from the first managed object instance based on the second filter parameter, and the alarm information is the management data.

In a possible implementation method, that the first network element determines a second filter parameter based on the network slice service identifier and the first filter parameter includes: The first network element adds the network slice service identifier to the first filter parameter, to obtain the second filter parameter.

According to a second aspect, this disclosure provides a method for obtaining management data. The method includes: A second network element sends a request message to a first network element, where the request message indicates a tenant identifier and at least one managed object instance, and the tenant identifier corresponds to at least one network slice service identifier; the second network element receives management data of a network slice service corresponding to the network slice service identifier in a first managed object instance from the first network element, where the second network element has permission to obtain the management data in the first managed object instance, the first managed object instance is a managed object instance in the at least one managed object instance, and an attribute of the first managed object instance includes the network slice service identifier. According to this solution, upon requesting to obtain management data, the second network element obtains management data at a network slice service identifier granularity, to be more specific, obtains management data related to a slice service subscribed by a tenant, such that data isolation between different tenants is implemented and data security and privacy is facilitated.

In a possible implementation method, the tenant identifier is the at least one network slice service identifier. Alternatively, the second network element sends the at least one network slice service identifier to the first network element.

In a possible implementation method, the at least one managed object instance includes one or more of the following items: a network function, a network slice instance, or a subnet slice instance.

In a possible implementation method, the request message includes the tenant identifier and information of the at least one managed object instance, and the request message is used to request to create a performance measurement task. That the second network element receives management data of a network slice service corresponding to the network slice service identifier in a first managed object instance from the first network element includes: The second network element receives a performance measurement result from the first network element, where the performance measurement result is the management data.

In a possible implementation method, the second network element receives a response message from the first network element, where the response message includes a second managed object instance in the at least one managed object instance, and the second network element does not have permission to obtain management data of the second managed object instance.

According to a third aspect, this disclosure provides an apparatus for obtaining management data. The apparatus may be a first network element, or a chip used for a first network element. The apparatus has a function of implementing the first aspect or the embodiments of first aspect. The function may be implemented by hardware, or may be implemented by hardware executing corresponding software. The hardware or the software includes one or more modules corresponding to the foregoing function.

According to a fourth aspect, this disclosure provides an apparatus for obtaining management data. The apparatus may be a second network element or a chip used for a second network element. The apparatus has a function of implementing the second aspect or the embodiments of the second aspect. The function may be implemented by hardware, or may be implemented by hardware executing corresponding software. The hardware or the software includes one or more modules corresponding to the foregoing function.

According to a fifth aspect, this disclosure provides an apparatus for obtaining management data, including a processor and a memory, where the memory is configured to store a computer executable instruction. When the apparatus runs, the processor executes the computer executable instruction stored in the memory, such that the apparatus performs the method in the foregoing aspects or the embodiments of the foregoing aspects.

According to a sixth aspect, this disclosure provides an apparatus for obtaining management data, including units or means configured to perform the foregoing aspects or steps in the foregoing aspects.

According to a seventh aspect, this disclosure provides an apparatus for obtaining management data, including a processor and an interface circuit. The processor is configured to communicate with another apparatus through the interface circuit, and perform the methods in the foregoing aspects or the embodiments of the foregoing aspects. The processor includes one or more processors.

According to an eighth aspect, this disclosure provides an apparatus for obtaining management data, including a processor configured to be connected to a memory, and configured to invoke a program stored in the memory, to perform the methods in the foregoing aspects or the embodiments of the foregoing aspects. The memory may be located inside the apparatus, or may be located outside the apparatus. In addition, the processor includes one or more processors.

According to a ninth aspect, this disclosure further provides a computer-readable storage medium. The computer-readable storage medium stores an instruction. When the instruction is run on a computer, the computer is enabled to perform the methods in the foregoing aspects or the embodiments of the foregoing aspects.

According to a tenth aspect, this disclosure further provides a computer program product including an instruction. When the computer program product runs on a computer, the computer is enabled to perform the methods in the foregoing aspects or the embodiments of the foregoing aspects.

According to an eleventh aspect, this disclosure further provides a chip system, including a processor configured to perform the methods in the foregoing aspects or the embodiments of the foregoing aspects.

According to a twelfth aspect, this disclosure provides a communications system, including a first network element and a second network element.

The second network element is configured to send a request message to the first network element, where the request message indicates a tenant identifier and at least one managed object instance, and the tenant identifier corresponds to at least one network slice service identifier; and receive management data of a network slice service corresponding to the network slice service identifier in a first managed object instance from the first network element.

The first network element is configured to receive the request message from the second network element; determines the first managed object instance in the at least one managed object instance based on the network slice service identifier, where the second network element has permission to obtain management data of the first managed object instance; obtain management data corresponding to the network slice service identifier from the first managed object instance; and send the management data to the second network element.

According to a thirteenth aspect, this disclosure provides a method for obtaining management data, including: A second network element sends a request message to a first network element, where the request message indicates a tenant identifier and at least one managed object instance, and the tenant identifier corresponds to at least one network slice service identifier; the first network element determines a first managed object instance in the at least one managed object instance based on the network slice service identifier, where the second network element has permission to obtain management data of the first managed object instance; the first network element obtains management data corresponding to the network slice service identifier from the first managed object instance; and the first network element sends the obtained management data to the second network element.

DESCRIPTION OF EMBODIMENTS

To make objectives, technical solutions, and advantages of this disclosure clearer, the following further describes this disclosure in detail with reference to the accompanying drawings. An operation in method embodiments may also be used in an apparatus embodiment or a system embodiment. In the descriptions of this disclosure, unless otherwise stated, "a plurality of" means two or more than two.

Figure 1:
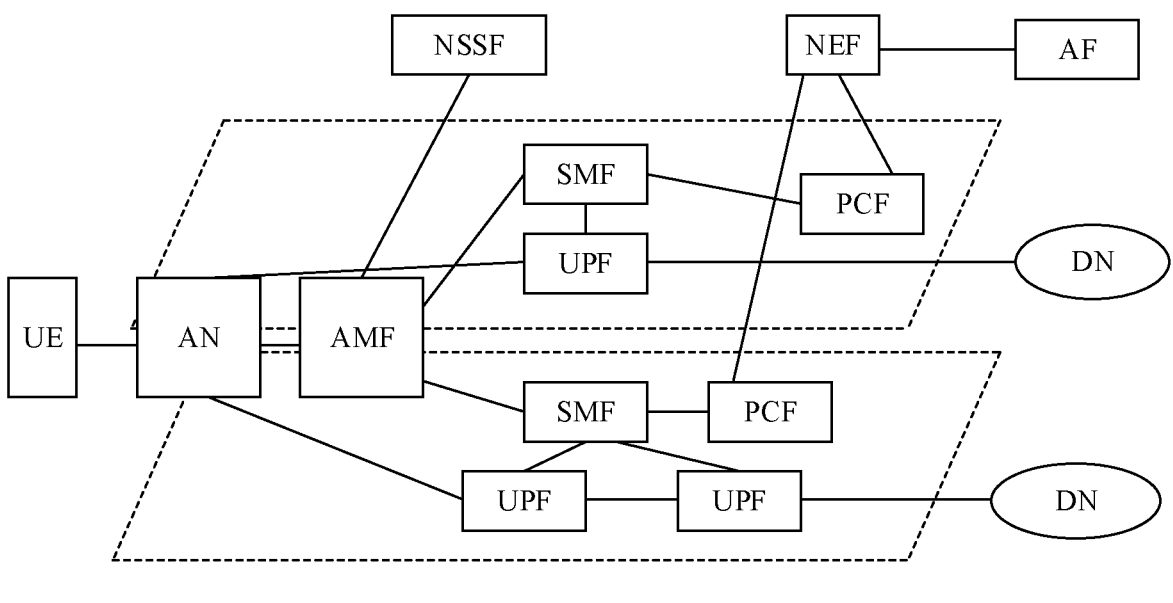
FIG. 1 is a schematic diagram of an architecture of a 5G system.

FIG. 1 is a schematic diagram of an architecture of a fifth generation (5G) mobile communications system. The system includes a terminal device, an access network (AN) device, a mobility management network element, a session management network element, a user plane network element, a policy control network element, a network slice selection network element, an application function network element and a data network (DN) connected to a telecom operator network. The mobility management network element, the session management network element, the policy control network element, the network slice selection network element, and the like are connected to a service bus. The terminal device may send service data to the DN or receive the service data from the DN through the AN device and the user plane network element.

The terminal device is a device having wireless transmission and reception functions, and may be deployed on land, where the deployment includes indoor or outdoor, handheld, wearable, or vehicle-mounted deployment, may be deployed on water (for example, on a ship), or may be deployed in air (for example, on an aerocraft, a balloon, and a satellite). The terminal device may be a mobile phone, a tablet computer (Pad), a computer having wireless transmission and reception functions, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this disclosure. The terminal device sometimes may also be referred as a user equipment (UE), a mobile station, a remote station, or the like. A technology, a device form, and a name used by the terminal device are not limited in the embodiments of this disclosure.

The AN device is used for wireless side access of a terminal device. The AN device may be deployed in forms, including a centralized unit (CU) and a distributed unit (DU) in a separate scenario and a single station scenario. In the separate scenario, the CU supports protocols such as a Radio Resource Control (RRC), a Packet Data Convergence Protocol (PDCP), and a Service Data Adaptation Protocol (SDAP). The DU mainly supports a radio link control (RLC) layer protocol, a media access control (MAC) layer protocol, and a physical layer protocol. In the single station scenario, a single station may include a new radio NodeB (e.g., a Next Generation Node B (gNB)), an evolved NodeB (eNB), a radio network controller (RNC), a NodeB (NB), a base station controller (BSC), a base transceiver station (BTS), a home base station, a base band unit (BBU), and the like.

The mobility management network element is mainly used for attachment, mobility management, a tracking area update process of a terminal in a mobile network. The mobility management network element terminates a non-access stratum (NAS) message, performs registration management, connection management and reachability management, allocates a tracking area (TA) list, performs mobility management and the like, and transparently routing a session management (SM) message to the session management network element. In the 5G communications system, the mobility management network element may be an access and mobility management function (AMF).

The session management network element is mainly used for session management, for example, session establishment, modification, or release in the mobile network. A function is, for example, assigning an internet protocol (IP) address to the terminal, or selecting a user plane network element that provides a packet forwarding function. In the 5G communications system, the session management network element may be a session management function (SMF).

The user plane network element is mainly used for processing a user packet, for example, forwarding, charging, or lawful interception. The user plane network element may also be referred to as a protocol data unit (PDU) session anchor (PSA). In the 5G communications system, the user plane network element may be a user plane function (UPF).

The policy control network element has a user subscription data management function, a policy control function, a charging policy control function, quality of service (QoS) control, and the like. In the 5G communications system, the policy control network element may be a policy control function (PCF).

The network slice selection network element is mainly used for selecting an appropriate network slice for a terminal service. In the 5G communications system, the network slice selection network element may be a network slice selection function (NSSF).

A network capability exposure network element may expose some functions of a network to an application in a controlled manner. In the 5G communications system, the network capability exposure network element may be a network exposure function (NEF).

The application function network element may provide service data of various applications for a control plane network element in a communications network of an operator, or obtain data information and control information of a network from a control plane network element in the communications network. In the 5G communications system, the application function network element may be an application function (AF).

The data network provides a data transmission service for a terminal, and may be a public data network (PDN), for example, the Internet.

The system architecture shown in FIG. 1 may further include a unified data management network element, a unified data storage network element, and a network repository function network element that are connected to the service bus.

The unified data management network element is responsible for managing subscription information of a terminal. In the 5G communications system, the unified data management network element may be a unified data management (UDM).

The unified data storage network element is responsible for storing structured data information, including subscription information, policy information, and network data or service data defined in a standard format. In the 5G communications system, the unified data repository network element may be a unified data repository (UDR).

The network repository function network element may be a network repository function (NRF) in a 5G communications system.

Figure 2:
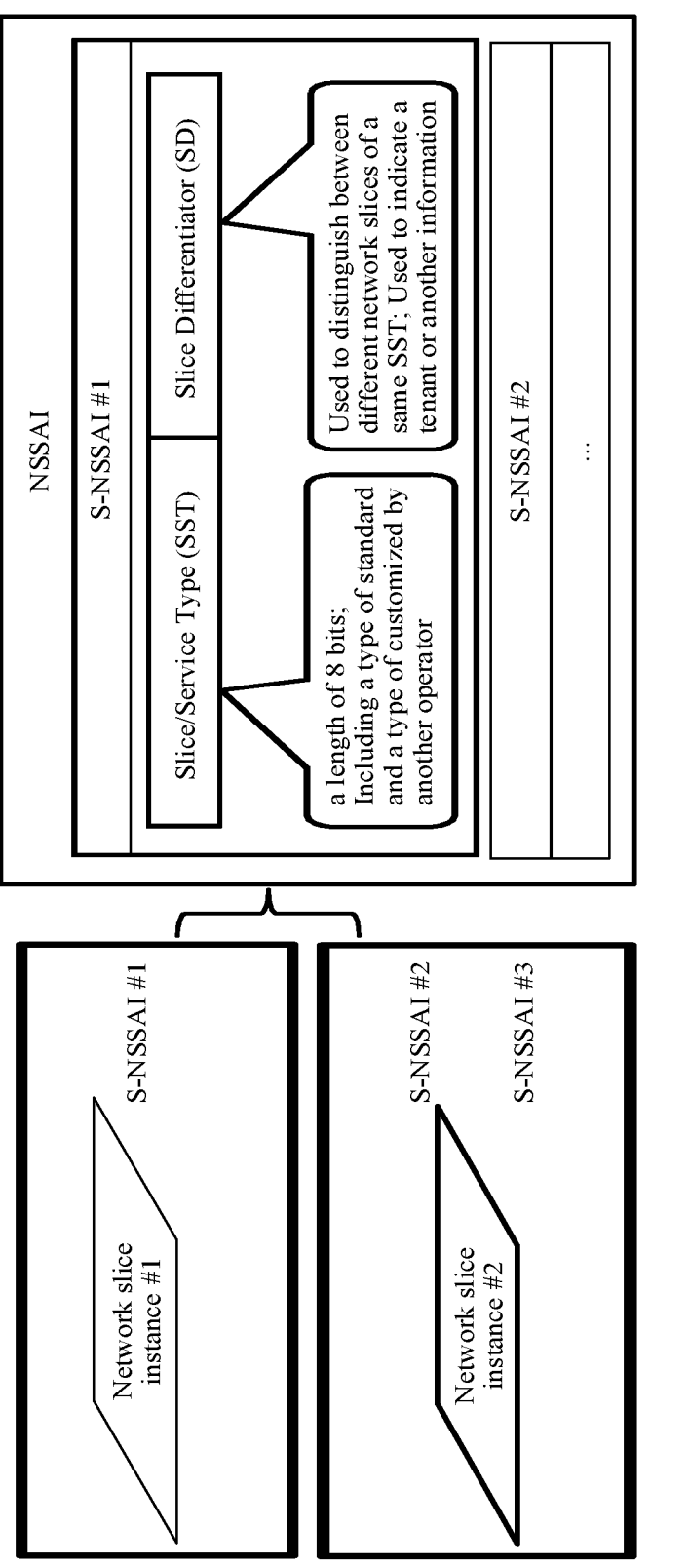
FIG. 2 shows an identifier and a related definition of a network slice.

To support a network slice, the 3rd Generation Partnership Project (3GPP) defines an identifier and a related definition of the network slice shown in FIG. 2.

A relatively isolated logical network that has a network feature, that supports a service capability, and that is created by the operator for a customer on a physical infrastructure of the communications network based on a network slice template according to a customer order is referred as a network slice instance (NSI). The network slice instance may be identified using an NSI ID.

The terminal device and the network use network slice selection assistance information (NSSAI) to select an appropriate network slice instance for various communications services of the terminal device. NSSAI consists of a set of single network slice selection assistance information (S-NSSAI). Each S-NSSAI consists of a slice/service type (SST) and a slice differentiator (SD). The SST is classified into a standard SST and a user-defined SST. The standard SST is supported by 5G networks of all operators and can ensure consistent service experience of an end user in a roaming scenario. The self-defined SST is supported only by a 5G network of a local operator. If roaming is required, the local operator need to sign a roaming agreement with another operator to map the SST of the local operator to a standard SST or an SST customized by the other operator in a roaming network. Currently, the defined standard SST includes enhanced mobile broadband (eMBB), ultra-reliable and low-latency communications (URLLC), and massive internet of things (MIoT). The SD is used to distinguish a plurality of network slices of a same SST, and how to use the SD is not limited in a standard.

The network slice is usually provided for the customer in a Network Slice as a Service (NSaaS) manner. The operator deploys one network slice instance to provide a service for a third party (an enterprise, an Internet service provider, another operator, or the like). The network slice instance (NSI) is a logical network that can actually run and that is created by the operator to provide a network slice service for a specified customer. Creating the network slice instance is a process of allocating network resources and forming a relatively isolated logical network through orchestration and configuration. In other words, the S-NSSAI is used as the identifier of the network slice service that is allowed to be used by the terminal device, and the NSI is the resource of the network slice. After the terminal device attaches to the 5G network, the AMF collaborates with the NSSF to select, for the terminal device based on the S-NSSAI, a network slice instance that provides a service. As shown in FIG. 2, a network slice instance #1 is selected for a service corresponding to S-NSSAI #1, and a network slice instance #2 is selected for services corresponding to S-NSSAI #2 and S-NSSAI #3.

Because the network slice instance is a relatively isolated logical network, the operator usually exposes a part of management data to the customer based on a service requirement. For example, when the customer of the network slice instance is an enterprise or an Internet service provider, the customer is usually allowed to obtain some key performance indicator (KPI) data of the network slice instance, for example, an end-to-end latency of the network slice. When the customer of the network slice instance is another operator, in addition to some key indicators of the network slice instance, the other operator usually allows the customer to obtain alarm information and event records of the network slice instance, e.g., so as to handle a fault in a timely manner.

A network management action includes a management action, a managed object, and management data related to the managed object. In a 3GPP standard, a management service (MnS) includes three parts: an operation, a managed object, and management data.

(1) The operation includes creation, modification, deletion, query, subscription, notification, and the like.

(2) The managed object is a network resource that can be managed, including a network function (NF), a network slice instance, and the like. The managed object is also referred to as a managed object instance (MOI). The MOI is an instance of a managed object class (MOC). The MOC is an abstract class definition of the network resource that can be managed, and the MOI is a network resource that can be managed.

(3) The management data refers to a key performance indicator or fault/alarm information of the managed object.

The MOC is described in a form of information object class (IOC). A series of IOC sets form network resource modeling (NRM). A management information base (MIB) is an instance of the NRM. The MIB stores a series of MOIs, MOI attributes, and relationships between the MOIs.

In a current technology, management exposure authorization and control are performed by associating the managed object instance with a tenant identifier (for example, an identity of another operator or a vertical industry). If a tenant wants to obtain the management data, the current technology checks which managed object instance (for example, the network slice instance #2 in FIG. 2) from which the tenant wants to obtain performance measurement data or alarm information, and then determines whether the tenant has management permission on the managed object instance. If the tenant has management permission on the managed object instance, the tenant is allowed to obtain the management data of the managed object instance.

In a slice as a service scenario, the tenant subscribes to a network slice communication service, and an identifier of the network slice communication service is S-NSSAI. The network slice instance serving as the managed object instance is not in a one-to-one correspondence with the S-NSSAI. For example, the network slice instance #2 in FIG. 2 provides network slice communication services identified by the S-NSSAI #2 and the S-NSSAI #3 for two different tenants. In the current technology, permission control is performed only on the managed object instance, namely, the network slice instance #2. This likely causes the tenant to obtain management data beyond proper permission. For example, a case in FIG. 2 is used as an example. A tenant subscribes to a network slice communication service identified by S-NSSAI #2. However, according to the current technology, the tenant has permission to obtain management data of a managed object instance network slice instance #2, in this case, the tenant can obtain performance statistics and alarm information related to the network slice communication service identified by the S-NSSAI #2, and can also obtain management data related to a network slice communication service identified by an S-NSSAI #3. The management data related to the network slice communication service identified by the S-NSSAI #3 exceeds management permission that the tenant should have. Therefore, the management data of different tenants cannot be isolated.

Therefore, a problem to be resolved in this disclosure is: how a third party (another operator or a vertical industry user) obtains, within a proper permission range, management data such as performance measurement data and alarm event information that are exposed by an operator to a tenant. For example, when some managed object instances simultaneously process services of a plurality of network slices, the tenant should be allowed to obtain only management data related to a slice service subscribed by the tenant.

The points of this disclosure may be summarized as follows: Another operator or a vertical industry user who acts as a network slice tenant (namely, a management data requester) of an operator requests to obtain management data, and a network management system (that is, a management service provider) of the operator obtains a corresponding S-NSSAI based on a tenant identity of the management data requester, determines, based on the obtained S-NSSAI, whether the management data requester is allowed to obtain the management data of a managed object. If the management data requester is allowed to obtain the management data, a measurement sub-item is supplemented for a performance measurement task based on the S-NSSAI corresponding to the management data requester, and performance measurement data of the measurement sub-item of a network slice that is identified by the S-NSSAI corresponding to the management data requester is reported, as a performance measurement result, to the management data requester. Alternatively, a filter parameter is supplemented for an alarm subscription task based on the S-NSSAI corresponding to the tenant, the S-NSSAI corresponding to the tenant is added to a filtering condition, then alarm event information is filtered based on the filtering condition, and a filtering result is reported to the management data requester.

The obtaining the S-NSSAI based on the tenant identity of the management data requester may be: obtaining, from information about a slice subscribed by the tenant in a commercial system, the S-NSSAI corresponding to the management data requester based on the tenant identity of the management data requester. Alternatively, S-NSSAI of management data subscribed by the tenant is used as the tenant identity of the management data requester, and the S-NSSAI is obtained from a tenant identity in a request for subscribing the management data.

The determining, based on the obtained S-NSSAI, whether the management data requester has permission to obtain the management data of the managed object may be: determining, based on whether S-NSSAI list in an attribute of the managed object includes the S-NSSAI corresponding to the management data requester, whether the management data requester is authorized to obtain the performance measurement data of the measurement sub-item of the network slice identified by the S-NSSAI; or determining, based on whether an S-NSSAI list in an attribute of the managed object includes the S-NSSAI corresponding to the management data requester, whether the management data requester is authorized to obtain the alarm event information filtered using an S-NSSAI identifier.

According to the method in this disclosure, whether the management data requester is authorized to obtain the exposed performance measurement data and the alarm event information of the managed object instance can be automatically verified, and a range of the authorized management data (that is, which performance measurement data and which alarm event information related to a network slice) can be determined. Performance measurement data or alarm information of a network slice that is not subscribed by the management data request can be automatically filtered out from the management data. Therefore, the third party obtains the performance measurement data and the alarm event information within a proper permission range.

Details are described below.

Figure 3:
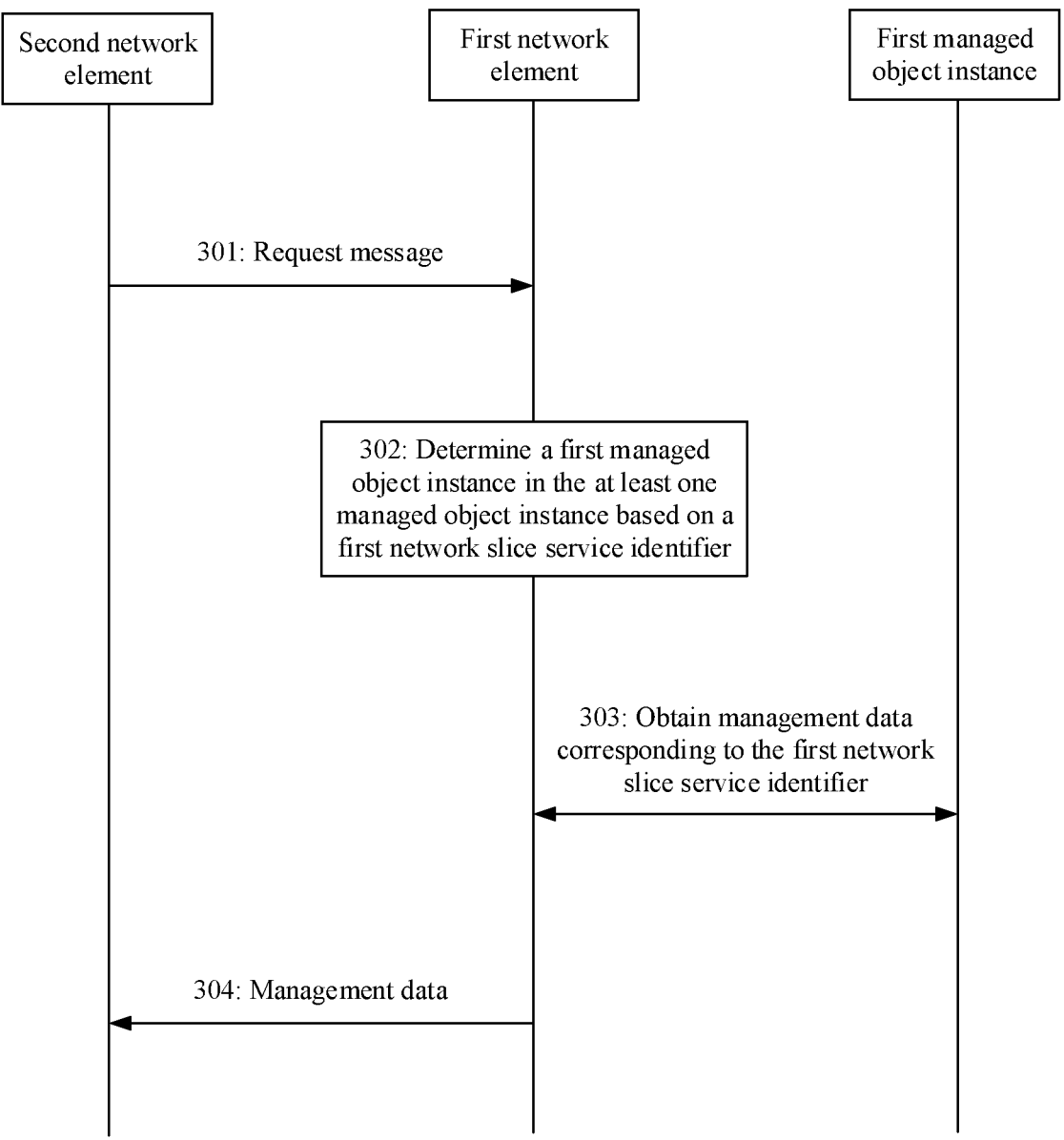
FIG. 3 is a schematic flowchart of a method for obtaining management data according to this disclosure.

Based on the architecture shown in FIG. 1, this disclosure provides a schematic flowchart of a method for obtaining management data. As shown in FIG. 3, the method includes the following steps.

S301: A second network element sends a request message to a first network element. Correspondingly, the first network element may receive the request message. The request message indicates a tenant identifier and at least one managed object instance. The tenant identifier corresponds to at least one network slice service identifier.

The second network element herein may also be referred to as a management data requester. For example, the second network element may be a terminal device corresponding to a tenant, and the tenant may be another operator or a vertical industry user. The first network element may also be referred to as a management service provider, for example, may be an operator.

The request message is used to request to obtain the management data in the managed object instance.

The managed object instance herein may be one or more items of a network function (such as an AMF, an SMF, or a UPF), a network slice instance, or a subnet slice instance.

In an implementation method, the request message carries the tenant identifier. After the step 301 and before step 302, the second network element further determines the at least one network slice service identifier corresponding to the tenant identifier. The following describes several methods for determining the at least one network slice service identifier corresponding to the tenant identifier.

Method 1: The tenant identifier is the at least one network slice service identifier.

According to the method, the tenant identifier is the at least one network slice service identifier. Therefore, after obtaining the tenant identifier, the second network element may determine the at least one network slice service identifier corresponding to the tenant identifier.

Method 2: The first network element obtains the at least one network slice service identifier corresponding to the tenant identifier from a third network element based on the tenant identifier.

Being varied with different third network elements, the method 2 may be further divided into the following method 2.1 to method 2.3.

Method 2.1: The third network element is the first network element.

The first network element locally stores a correspondence between the tenant identifier and the network slice service identifier, such that the first network element may locally obtain the at least one network slice service identifier corresponding to the tenant identifier.

Method 2.2: The third network element is the second network element.

After obtaining the tenant identifier from the request message, the first network element requests to obtain the at least one network slice service identifier corresponding to the tenant identifier from the second network element based on the tenant identifier.

Method 2.3: The third network element is a database.

The database (for example, an MIB, an NRM information base, or a service provisioning management database) stores the correspondence between the tenant identifier and the network slice service identifier, such that the first network element may obtain the at least one network slice service identifier corresponding to the tenant identifier from the database.

Step 302: The first network element determines a first managed object instance in at least one managed object instance based on the network slice service identifier, where the second network element has permission to obtain management data of the first managed object instance.

To be more specific, the first managed object instance determined in step 302 is a managed object instance that is in the at least one managed object instance and for which the second network element has permission to obtain the management data. For example, the first managed object instance may be determined according to the following method: For any one managed object instance in the at least one managed object instance, if the first network element determines that an attribute of the any one managed object instance includes the at least one network slice service identifier, the first network element determines that the any one managed object instance is the first managed object instance.

It should be noted that the attribute herein may also be referred to as a network slice service identifier attribute or an S-NSSAI attribute. The first network element may obtain the attribute of each managed object instance from the database.

The following uses an example to describe the method. For example, the at least one network slice service identifier corresponding to the tenant identifier is: S-NSSAI #1 and S-NSSAI #2. The at least one managed object instance indicated by the request message is: an MOI #1, where an attribute of the MOI #1 includes the S-NSSAI #1, the S-NSSAI #2, and S-NSSAI #3; an MOI #2, where an attribute of the MOI #2 includes the S-NSSAI #1, the S-NSSAI #3, and S-NSSAI #4; and an MOI #3, where an attribute of the MOI #3 includes the S-NSSAI #3, the S-NSSAI #4, and S-NSSAI #5.

For the S-NSSAI #1, the attribute of the MOI #1 and the attribute of the MOI #2 include the S-NSSAI #1, and the attribute of the MOI #3 does not include the S-NSSAI #1. Therefore, the first managed object instance corresponding to the S-NSSAI #1 is the MOI #1 or the MOI #2.

For the S-NSSAI #2, the attribute of the MOI #1 includes the S-NSSAI #2, and the attribute of the MOI #2 and the attribute of the MOI #3 do not include the S-NSSAI #2. Therefore, the first managed object instance corresponding to the S-NSSAI #2 is the MOI #1.

The MOI #1 and the MOI #2 are MOIs for which the second network element has permission to obtain the management data, and the MOI #3 is an MOI for which the second network element does not have permission to obtain the management data. In this disclosure, the managed object instance for which the second network element does not have permission to obtain the management data is also referred to as a second management instance. Therefore, the MOI #3 in this example is also referred as a second managed object instance.

Step 303: The first network element obtains management data corresponding to the network slice service identifier from the first managed object instance.

The management data corresponding to the network slice service identifier herein may also be referred to as management data of a network slice service corresponding to the network slice service identifier.

Based on this step, the first network element obtains the management data corresponding to the network slice service identifier from the first managed object instance, but does not obtain other management data from the first managed object instance. This implements isolation between management data corresponding to different network slice service identifiers, and facilitates data security and privacy.

For example, in the foregoing example, the first network element obtains the management data as follows.

(1) The first network element obtains management data corresponding to the S-NSSAI #1 from the MOI #1.

(2) The first network element obtains management data corresponding to the S-NSSAI #1 from the MOI #2.

(3) The first network element obtains management data corresponding to the S-NSSAI #2 from the MOI #1.

It can be learned that the MOI #1 includes the management data respectively corresponding to the S-NSSAI #1, the S-NSSAI #2, and the S-NSSAI #3, and the first network element obtains only the management data corresponding to the S-NSSAI #1 and the S-NSSAI #2, and does not obtain the management data corresponding to the S-NSSAI #3. The MOI #2 includes the management data respectively corresponding to the S-NSSAI #1, the S-NSSAI #3, and the S-NSSAI #4, and the first network element obtains only the management data corresponding to the S-NSSAI #1, and does not obtain the management data corresponding to the S-NSSAI #3 and the S-NSSAI #4.

In other words, in this disclosure, the management data is obtained at a granularity of a network slice service identifier. This implements refined data division and facilitates data security.

Step 304: The first network element sends the obtained management data to the second network element. Correspondingly, the second network element may receive the obtained management data.

According to the foregoing embodiment, upon requesting to obtain management data, the second network element obtains management data at a granularity of a network slice service identifier, to be more specific, obtains management data related to a slice service subscribed by the second network element, such that data isolation between different tenants is implemented and data security and privacy is facilitated.

For the embodiment shown in FIG. 3, the following provides description with reference to different application scenarios.

Scenario 1: Performance Measurement

In this scenario, the request message in step 301 is used to request to create a performance measurement task. The performance measurement task measures management data in a managed object instance.

In this scenario, the request message in step 301 includes the tenant identifier and the at least one network slice service identifier.

Step 303 is: The first network element sets a measurement sub-item for the performance measurement task corresponding to the first managed object instance based on the network slice service identifier, and creates the performance measurement task, where the performance measurement task is used to measure the management data of the network slice service corresponding to the network slice service identifier in the first managed object instance. The first network element receives a performance measurement result corresponding to the performance measurement task from the first managed object instance, where the performance measurement result is management data of the measurement sub-item.

Based on this scenario, optionally, after step 303, the method may further include the following step: The first network element sends a response message to the second network element, where the response message includes an identifier of the created performance measurement task and the second managed object instance in the at least one managed object instance. The second network element does not have permission to obtain management data of the second managed object instance, and the second managed object instance is an unauthorized managed object instance. Refer to the foregoing example. The MOI #3 is the second managed object instance.

It should be noted that, if the second managed object instance does not exist, the response message does not need to carry the second managed object instance. If the second network element does not have permission to obtain management data of each managed object instance in the at least one managed object instance, the created performance measurement task fails. The response message sent by the first network element to the second network element does not carry the identifier of the created performance measurement task, and includes only the second managed object instance.

Scenario 2: Alarm Information Subscription

In this scenario, the request message in step 301 is used to request to create an alarm information subscription task. The alarm information subscription task is used to subscribe to management data in a managed object instance. The request message further indicates a first filter parameter. The first filter parameter is used to determine alarm information of the at least one managed object instance. To be more specific, after alarm information of a managed object instance meets a determining criterion specified by the first filter parameter, the alarm information is obtained.

The first filter parameter is used to select alarm information whose parameter meets a specified filtering constraint condition. For example, the filtering constraint condition includes that an alarm severity is greater than or equal to a specified level, an alarm event type is a communication error type alarm or a quality of service alarm, and an alarm occurrence time is within a specified time period.

In this scenario, content carried in the request message may be implemented using a plurality of different methods. The following describes several methods.

Implementation method 1: The request message carries the tenant identifier, the least one managed object instance, and the first filter parameter.

In this case, the first filter parameter is used to filter the alarm information in the at least one managed object instance.

Implementation method 2: The request message carries the tenant identifier and the at least one managed object instance, and does not carry the first filter parameter.

When the request message does not carry the first filter parameter, it implicitly specifies that the first filter parameter is empty. In this case, the first filter parameter is not used to perform a filtering operation, or it is understood that the alarm information filtered through the first filter parameter is all alarm information of the at least one object instance.

Implementation method 3: The request message carries the tenant identifier and the first filter parameter, but does not carry the managed object instance.

When the request message does not carry the managed object instance, it implicitly specifies that the alarm information is obtained for all managed object instances. In this case, the first filter parameter is used to filter alarm information of all the managed object instances.

Implementation method 4: The request message carries the tenant identifier, but does not carry the first filter parameter or the managed object instance.

When the request message does not carry the first filter parameter or the managed object instance, it implicitly specifies that the first filter parameter is empty, and the alarm information is obtained for all the managed object instances. In this case, the first filter parameter is not used to perform a filtering operation, or it is understood that the alarm information filtered through the first filter parameter is alarm information of all the managed object instances.

Based on the scenario 2, step 303 is: The first network element determines a second filter parameter based on the network slice service identifier and the first filter parameter, and creates the alarm information subscription task, where the alarm information subscription task corresponds to the second filter parameter, and the second filter parameter is used to obtain alarm information corresponding to the network slice service identifier in the first managed object instance; and the alarm information corresponding to the alarm information subscription task is received by the first network element from the first managed object instance, where the alarm information is the management data.

That the first network element determines the second filter parameter based on the network slice service identifier and the first filter parameter may be: for example, the first network element adds the network slice service identifier to the first filter parameter to obtain the second filter parameter. Alternatively, it may be understood that the second filter parameter meets the determining criterion specified by the first filter parameter, and the alarm information includes the network slice service identifier.

Scenario 3: Alarm Information Query

In this scenario, the request message in step 301 is used to request to query alarm information. The request message further indicates a first filter parameter. The first filter parameter is used to determine alarm information of the at least one managed object instance. To be more specific, after the alarm information of the managed object instance meets a determining criterion specified by the first filter parameter, the alarm information is obtained.

In this scenario, content carried in the request message may be implemented using a plurality of different methods, or may include four different implementation methods in the foregoing scenario 2. For details, refer to the foregoing descriptions.

Based on the scenario 3, step 303 is: The first network element determines a second filter parameter based on the network slice service identifier; and the first network element obtains alarm information corresponding to the network slice service identifier from the first managed object instance based on the second filter parameter, where the alarm information is the management data. That the first network element determines the second filter parameter based on the network slice service identifier and the first filter parameter may be: for example, the first network element adds the network slice service identifier to the first filter parameter to obtain the second filter parameter. Alternatively, it may be understood that the second filter parameter meets the determining criterion specified by the first filter parameter, and the alarm information includes the network slice service identifier.

It should be noted that a difference between the scenario 3 and the scenario 2 mainly lies in that: In the scenario 2, the alarm information is obtained through the alarm subscription task. When a condition of the second filter parameter is met, the first managed object instance sends the alarm information to the first network element, such that the first network element may periodically send the alarm information subscribed within a period of time to the second network element, or the first network element may immediately send the alarm information to the second network element after receiving the alarm information. In the scenario 3, the alarm information is obtained through query. To be more specific, the first network element immediately obtains a query result meeting the condition of the second filter parameter from the first managed object instance based on a request of the second network element, where the query result includes the alarm information, and then the first network element sends the query result to the second network element.

Figure 4:
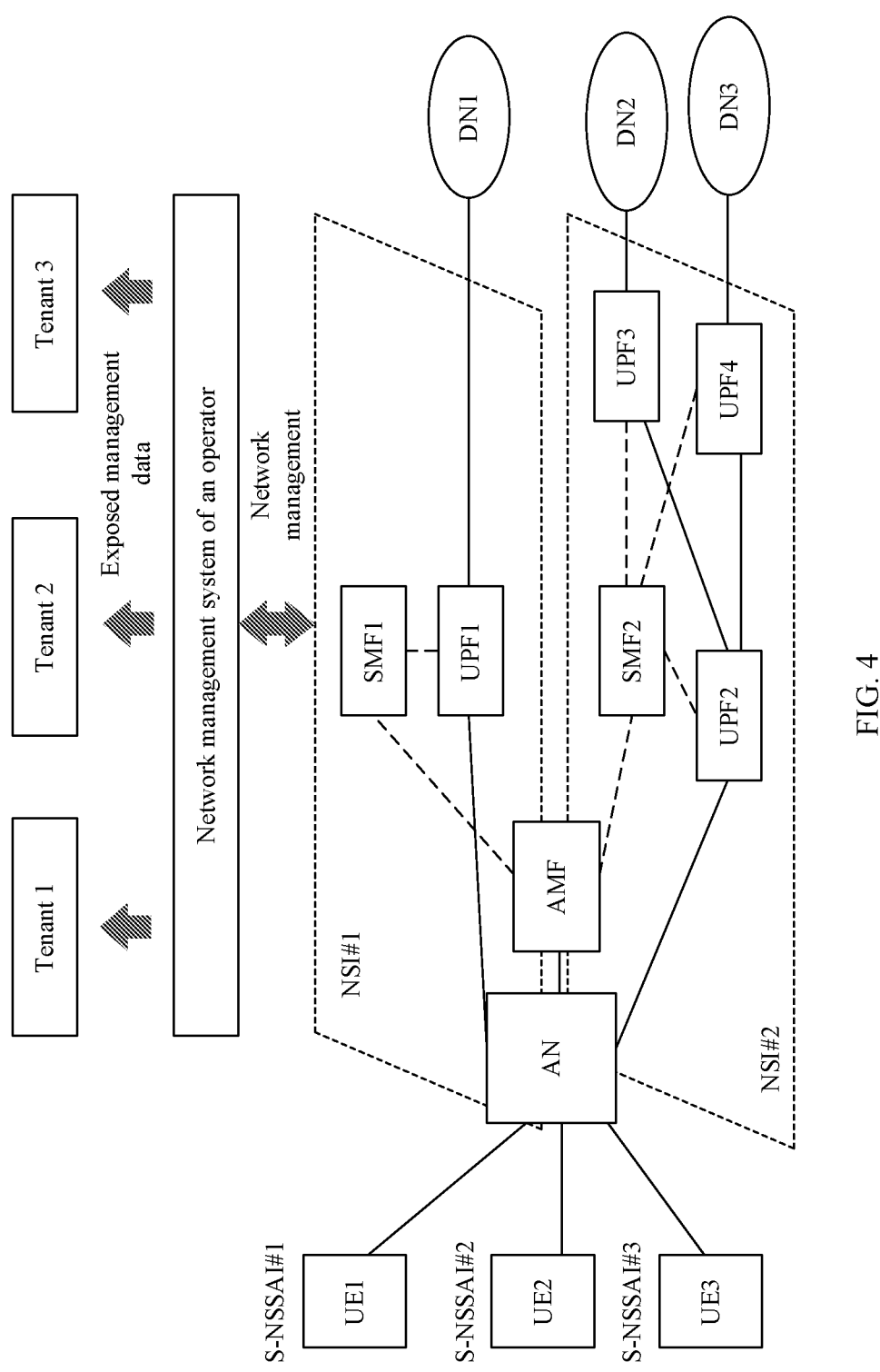
FIG. 4 is an example diagram of a network according to this disclosure.

The following uses an example to describe the embodiment in FIG. 3. FIG. 4 is an example diagram of a network according to this disclosure. An operator deploys two network slice instances: an NSI #1 and an NSI #2. Three tenants subscribe to the operator's network slice services, which are respectively allocated identifiers S-NSSAI #1, S-NSSAI #2, and S-NSSAI #3. UE 1 is a terminal device of a tenant 1, accesses the network slice instance NSI #1 using the S-NSSAI #1, and communicates with a data network DN 1. UE 2 is a terminal device of a tenant 2, accesses the network slice instance NSI #2 using the S-NSSAI #2, and communicates with a data network DN 2. UE 3 is a terminal device of a tenant 3, accesses the network slice instance NSI #2 using the S-NSSAI #3, and communicates with a data network DN 3. A network management system of the operator manages the network slices, a network function, and a communication service. The tenant's system or device functions as a management data requester, and the operator's management system functions as a management service provider. The management data requester obtains, by invoking a management service provided by the management service provider, management data related to a network slice subscribed by the requester, where the management data includes performance statistics data, alarm information, or the like.

The following methods for obtaining management data shown in FIG. 5A and FIG. 5B, FIG. 7, and FIG. 8 are all described based on the example shown in FIG. 4.

Figure 5A:
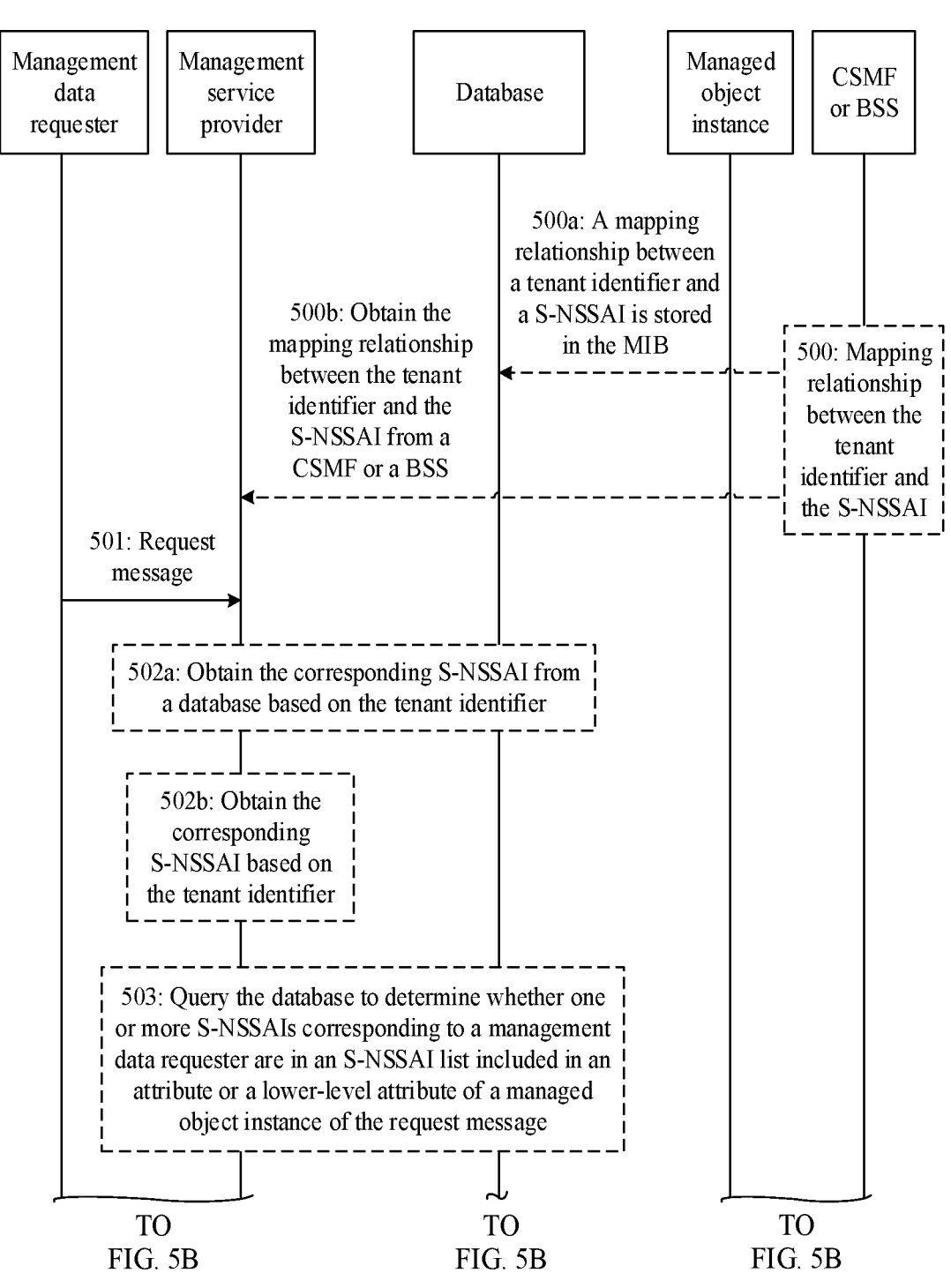
FIG. 5A and FIG. 5B are a schematic flowchart of another method for obtaining management data according to this disclosure.
Figure 5B:
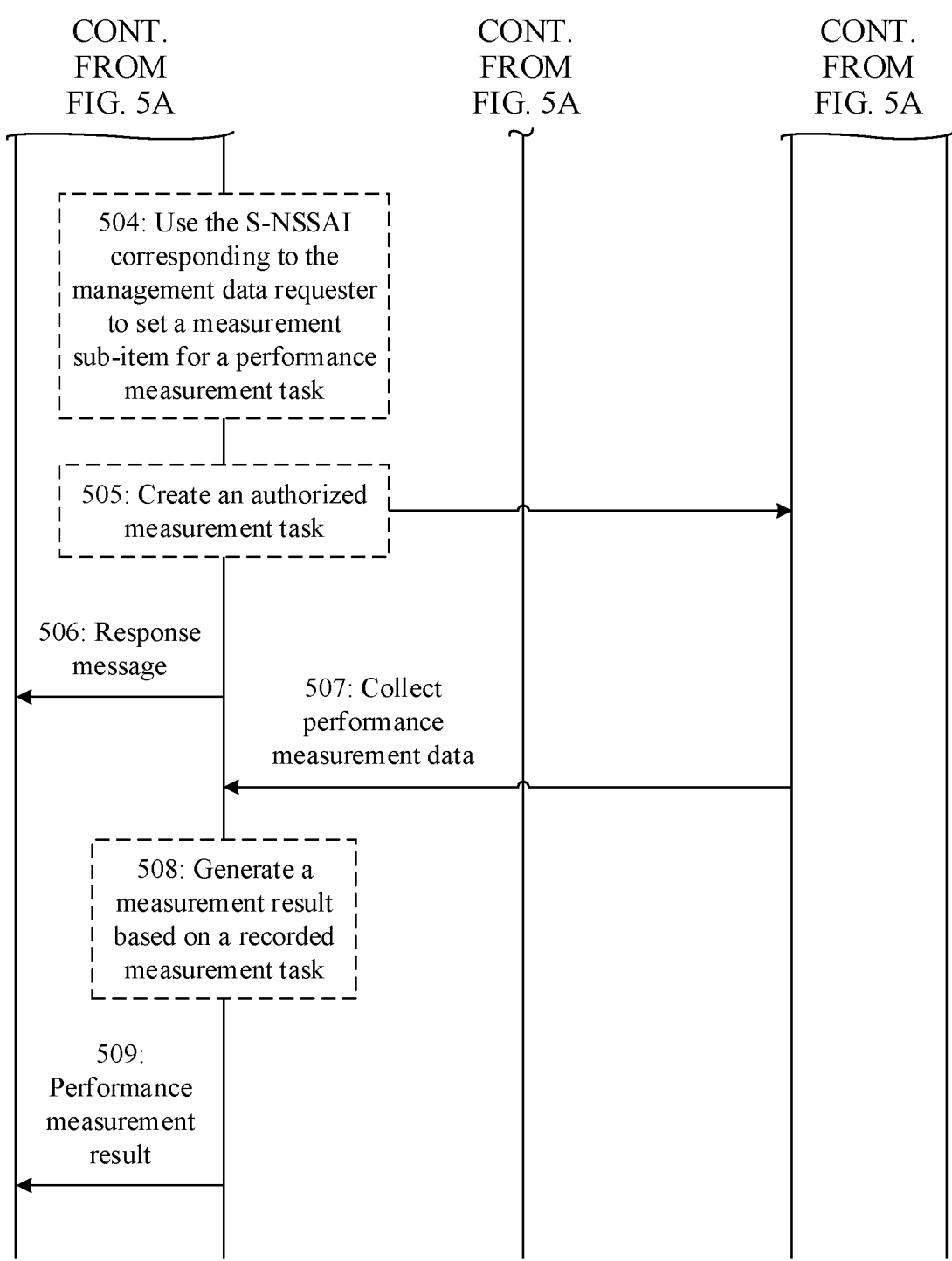

As shown in FIG. 5A and FIG. 5B, FIG. 5A and FIG. 5B are a schematic flowchart of still another method for obtaining management data according to this disclosure. In system interaction shown in FIG. 5A and FIG. 5B, a network slice communication service subscribed by a tenant is managed and recorded by a communication service management function (CSMF) or a business support system (BSS). The CSMF or BSS records a tenant identifier (tenant ID), and an identifier, namely, S-NSSAI of a network slice service subscribed by the tenant. In other words, a mapping relationship between the tenant identifier and the S-NSSAI is managed by the CSMF or the BSS. The mapping relationship may be stored in the CSMF or the BSS (step 500), and is provided to a management service provider when necessary (step 500b in the figure), and is further stored in the management service provider. Alternatively, the mapping relationship may be stored in a database (for example, an MIB, an NRM information base, or a service provisioning management database) (as shown in step 500a in the figure). The management service provider may directly access the database to obtain the mapping relationship when necessary.

The method includes the following steps.

Step 501: A management data requester (the tenant 2 in FIG. 4 is used as an example) sends a request message for creating a performance measurement task to a management service provider in an operator network management system, where the request message carries parameters such as an identifier of the tenant 2, a managed object instance list (MOI-list), and a performance measurement type.

For example, the managed object instance list includes an AMF, a central unit (CU) of a next-generation radio access network (NG-RAN), and a MOI of a UPF1.

For example, the performance measurement type parameter includes an average quantity of registered users of the AMF, an uplink or downlink data amount of a cell packet data convergence protocol (PDCP) service data unit (SDU) of the CU, and a quantity of established sessions of the UPF1.

In an example, the request message may be a createMeasurementJob message.

Step 502: The management service provider queries the database (as shown in step 502a) based on the tenant identifier in the received request message for creating a performance measurement task, to obtain one or more pieces of S-NSSAI corresponding to the management data requester, namely, an identifier S-NSSAI #2 of a network slice service subscribed by the tenant 2. Alternatively, the management service provider queries the mapping relationship that is between the tenant identifier and the S-NSSAI and that is obtained from the CSMF or the BSS, to obtain the one or more pieces of S-NSSAI corresponding to the management data requester (as shown in step 502b).

Step 503: The management service provider queries the database to determine whether the one or more pieces of S-NSSAI corresponding to the management data requester are in an S-NSSAI list included in a managed object instance attribute or a lower-level attribute in the request message.

Figure 6:
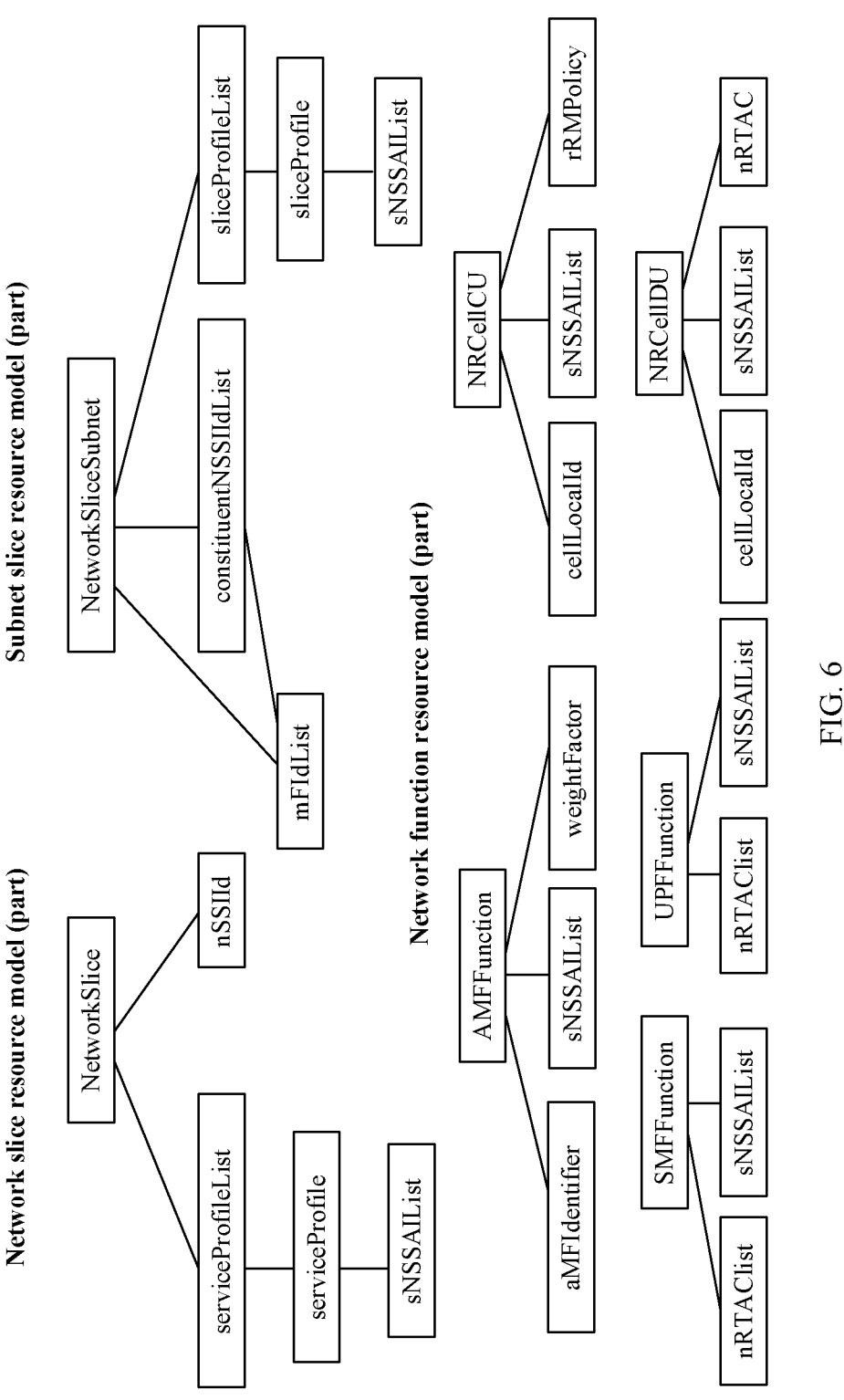
FIG. 6 is a resource model of some managed objects defined in a 3$^{rd}$ Generation Partnership Project (3GPP) standard.

FIG. 6 shows a resource model of a part of managed objects defined in a 3GPP standard.

If the managed object instance is a network slice instance (NetworkSlice), the network slice instance includes an S-NSSAI attribute level serviceProfileList/serviceProfile/sNSSAIList, where serviceProfileList is a communication service description list of the network slice instance and includes one or more communication service description serviceProfiles. Each communication service description serviceProfile includes a list of S-NSSAIs related to a communication service, and the list includes one or more network slice service identifiers S-NSSAIs.

If the managed object instance is a subnet slice instance (e.g., NetworkSliceSubnet), the subnet slice instance includes an S-NSSAI attribute level sliceProfileList/sliceProfile/sNSSAIList, where sliceProfileList is a feature description list of a network slice instance and includes one or more descriptions sliceProfiles of the network slice instance to which a subnet slice belongs. Each network slice instance description sliceProfile includes a list of S-NSSAIs related to a network slice service, and the list includes one or more network slice service identifiers S-NSSAIs.

If the managed object instance is a network function, for example, an AMF, an SMF, a UPF, or a CU and a DU of a next-generation or new radio (NR) cellular network, it has an sNSSAIList attribute. The network function includes one or more S-NSSAIs and this indicates that the network function supports to process a service of one or more network slices.

For example, the managed object list in the request message in step 501 includes the AMF, the CU, and the UPF1, and the management service provider confirms that S-NSSAI corresponding to the management data requester obtained in step 502 is in an sNSSAIList attribute of the AMF and an sNSSAIList attribute of the CU, but is not in an sNSSAIList attribute of the UPF1.

If none of the S-NSSAIs corresponding to the requester is in the managed object instance attribute or the lower-level attribute, namely, sNSSAIList attribute, it is determined that the requester does not have permission to obtain the management data of the managed object instance, and the requester is removed from the managed object instance list. For example, if the management data requester corresponds to the S-NSSAI #2, but the S-NSSAI #2 is not in the sNSSAIList attribute of the UPF1, it is determined that the management data requester does not have permission to obtain management data of the UPF1, and the UPF1 is removed from the managed object list.

If the requester does not have permission to obtain management data of all managed object instances, step 506 is directly performed, and a measurement task creation failure response message is returned to the management data requester, where the response message carries an unauthorized managed object instance, for example, UPF1. Otherwise, step 504 continues to be performed to prepare a performance measurement task for a managed object instance, for example, the AMF and the CU, for which the requester has permission to obtain management data. However, an unauthorized managed object instance (for example, the UPF1) is still carried in a subsequent step 506.

It should be noted that the present disclosure may further include a case in which the network slice instance (NetworkSlice) and the subnet slice instance (NetworkSliceSubnet) directly include the sNSSAIList attribute. In other words, the sNSSAIList attribute level is similar to that of a network function. In this case, a processing method is the same as that of the network function.

According to step 503, the managed object instance of the management data that the requester is allowed to access and that is corresponding to each S-NSSAI in the request message may be determined.

Step 504: The management service provider uses the one or more S-NSSAIs that correspond to the management data requester and that are obtained through filtering in step 503 to set a measurement sub-item for the performance measurement task of the managed object instance.

For example, the S-NSSAI #2 corresponding to the management data requester is used to set a measurement sub-item for an average quantity of registered users of the AMF, and is used to set a measurement sub-item for an uplink or downlink data amount of a cell PDCP SDU of the CU. In other words, only statistical sub-items of the average quantity of registered users of the AMF and the uplink or downlink data amount of the cell PDCP SDU of the CU of the network slice identified by the S-NSSAI #2 are provided for the management data requester, instead of overall statistical items of the AMF or CU.

For example, the measurement type requested in step 501 is RM.RegisteredSubNbrMean defined in the 3GPP TS 28.552, namely, a measurement type of an average registered user quantity of a register management (RM) measurement type. After the processing in step 504, the measurement type used for creating the measurement task is changed to RM.RegisteredSubNbrMean.SNSSAI, namely, a network slice measurement sub-type of a registered user quantity measurement type of the registration management measurement type. RM.RegisteredSubNbrMean.SNSSAI is a statistical sub-item of the average registered user quantity of the AMF related to the network slice identified by the S-NSSAI #2.

Step 505: The management service provider uses the statistical sub-item obtained in step 504 to create a performance measurement task for the management data requester, namely, a statistical sub-item related to the network slice identified by the one or more S-NSSAIs corresponding to the requester, where performance data collected by the performance measurement task is performance data that the management data requester is authorized to obtain.

Step 506: The management service provider returns a response message of creating the performance measurement task to the management data requester.

If the task is created successfully, the response message carries an identifier of the performance measurement task. If the management data requester does not have permission to obtain the management data of a managed object instance (namely, the second managed object instance in the embodiment of FIG. 3) in the request message, the managed object instance MOI is carried in a non-support list. If the measurement task is not successfully created, a status of the task is set to creation failed.

Step 507: The management service provider periodically collects or collects, triggered by an event, the performance measurement data of the managed object instance.

Step 508: The management service provider generates a measurement result based on the collected measurement data and the recorded measurement task, to be more specific, uses a performance measurement sub-item related to the network slice identified by the one or more S-NSSAIs corresponding to the management data requester as the measurement result of the measurement task.

Step 509: The management service provider periodically sends or sends, triggered by an event, the performance measurement result to the management data requester.

It should be noted that if the management data requester corresponds to a plurality of pieces of S-NSSAIs, for example, the S-NSSAI #2 and an S-NSSAI #5, the finally created performance measurement task includes a plurality of statistical sub-items distinguished by the S-NSSAIs, for example, the statistical sub-item of the average quantity of registered users of the AMF related to the network slice identified by the S-NSSAI #2 and a statistical sub-item of an average quantity of registered users of the AMF related to a network slice identified by the S-NSSAI #5.

According to the foregoing embodiment, whether the management data requester is authorized to obtain the performance measurement data of the managed object instance can be automatically verified, and a range of the authorized management data (that is, which performance measurement data related to a network slice) can be determined. Performance measurement data of a network slice that is not subscribed by the management data requester can be automatically filtered out from the management data. Therefore, the performance measurement data is exposed to a third party within a proper permission range. Whether the management data requester has permission to obtain the management data of the managed object instance is determined based on whether the S-NSSAI corresponding to the management requester is included in the managed object instance attribute. The measurement sub-item is set for the performance measurement task based on the S-NSSAI corresponding to the management data requester. Performance measurement data of a measurement sub-item of a network slice that is identified by the S-NSSAI corresponding to the management data requester is used as a performance measurement result. In this way, the performance measurement data of the network slice that is not subscribed by the management data requester can be automatically filtered out from the management data.

Figure 7:
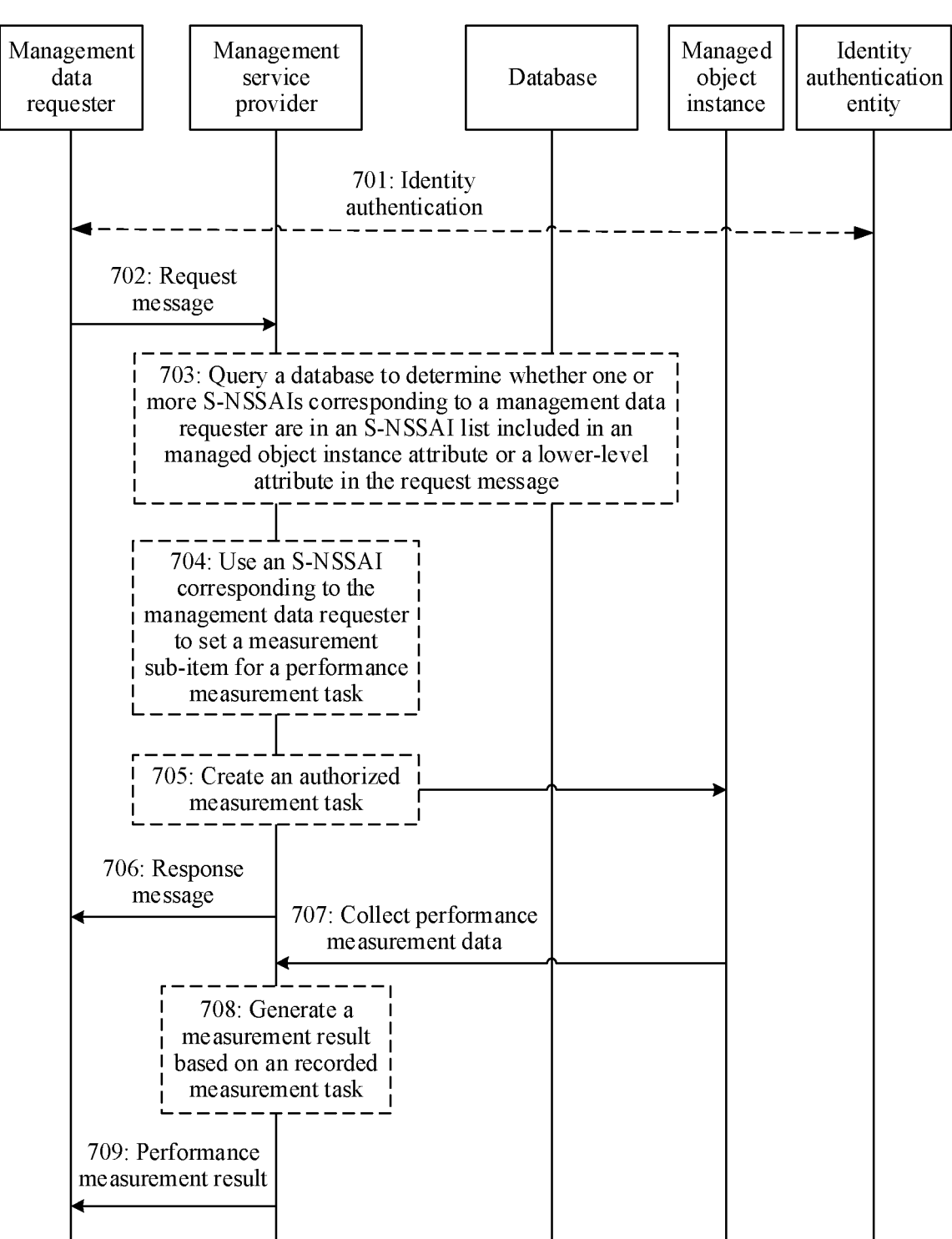
FIG. 7 is a schematic flowchart of another method for obtaining management data according to this disclosure.

As shown in FIG. 7, FIG. 7 is a schematic flowchart of still another method for obtaining management data according to this disclosure. A scenario in this embodiment is similar to the scenario in the embodiment in FIG. 5A and FIG. 5B. The method includes the following steps.

Step 701: A management data requester requests an identity authentication entity to perform identity authentication.

The identity authentication entity may be an exposed control management function or another identity authentication entity defined in a 3GPP Technical Specification (TS) 28.533 standard. In a process of performing identity authentication on the requester, the identity authentication entity can determine that the requester is a tenant, in other words, the requester actually has a tenant identifier. The identity authentication entity may further issue, based on a result of the requester identity authentication, a token to the management data requester, where the token includes the tenant identifier. If the requester has the token, the requester can be allowed to invoke a management service or an application programming interface (API) exposed by a management service provider.

Step 702: The management service provider in an operator network management system receives a request message for creating a performance measurement task from the management data requester.

An identifier of a tenant 2 carried in the request message is an identifier of a subscribed network slice service, namely, S-NSSAI #2. The request message may be forwarded to the management service provider by the identity authentication entity. In this case, the identity authentication entity has confirmed, in the authentication process, that a tenant identity of the requester is the S-NSSAI #2 or the tenant identity corresponds to the S-NSSAI #2. If the request message is directly sent from the management data requester, the S-NSSAI #2 is carried in the access token, and the management service provider verifies the token. A verification result indicates that the tenant identity of the management data requester is the S-NSSAI #2 or the tenant identity corresponds to the S-NSSAI #2. Other parameters in the request message are the same as those in the embodiment in FIG. 5A and FIG. 5B.

The management service provider obtains the S-NSSAI corresponding to the management data requester, namely, the S-NSSAI #2 based on the tenant identifier in the request message.

Steps 703 to 709 are the same as steps 503 to 509 in the embodiment in FIG. 5A and FIG. 5B. Refer to the foregoing descriptions.

It should be noted that, in this embodiment, the tenant identifier in the request message in step 702 may not be the identifier of the subscribed network slice service. In this case, the embodiment in FIG. 7 may be the same as the embodiment in FIG. 5A and FIG. 5B. At least one network slice service identifier corresponding to the tenant identifier is obtained in a manner similar to that in step 502a or step 502b.

According to the foregoing embodiment, whether the management data requester is authorized to obtain performance measurement data of a managed object instance can be automatically verified, and a range of the authorized management data (that is, which performance measurement data related to a network slice) can be determined. Performance measurement data of a network slice that is not subscribed by the management data requester can be automatically filtered out from the management data. Therefore, the performance measurement data is exposed to a third party within a proper permission range. Whether the management data requester has permission to obtain the management data of the managed object instance is determined based on whether the S-NSSAI corresponding to the management requester is included in the managed object instance attribute. The measurement sub-item is set for the performance measurement task based on the S-NSSAI corresponding to the management data requester. Performance measurement data of a measurement sub-item of a network slice that is identified by the S-NSSAI corresponding to the management data requester is used as a performance measurement result. In this way, the performance measurement data of the network slice that is not subscribed by the management data requester can be automatically filtered out from the management data.

Figure 8:
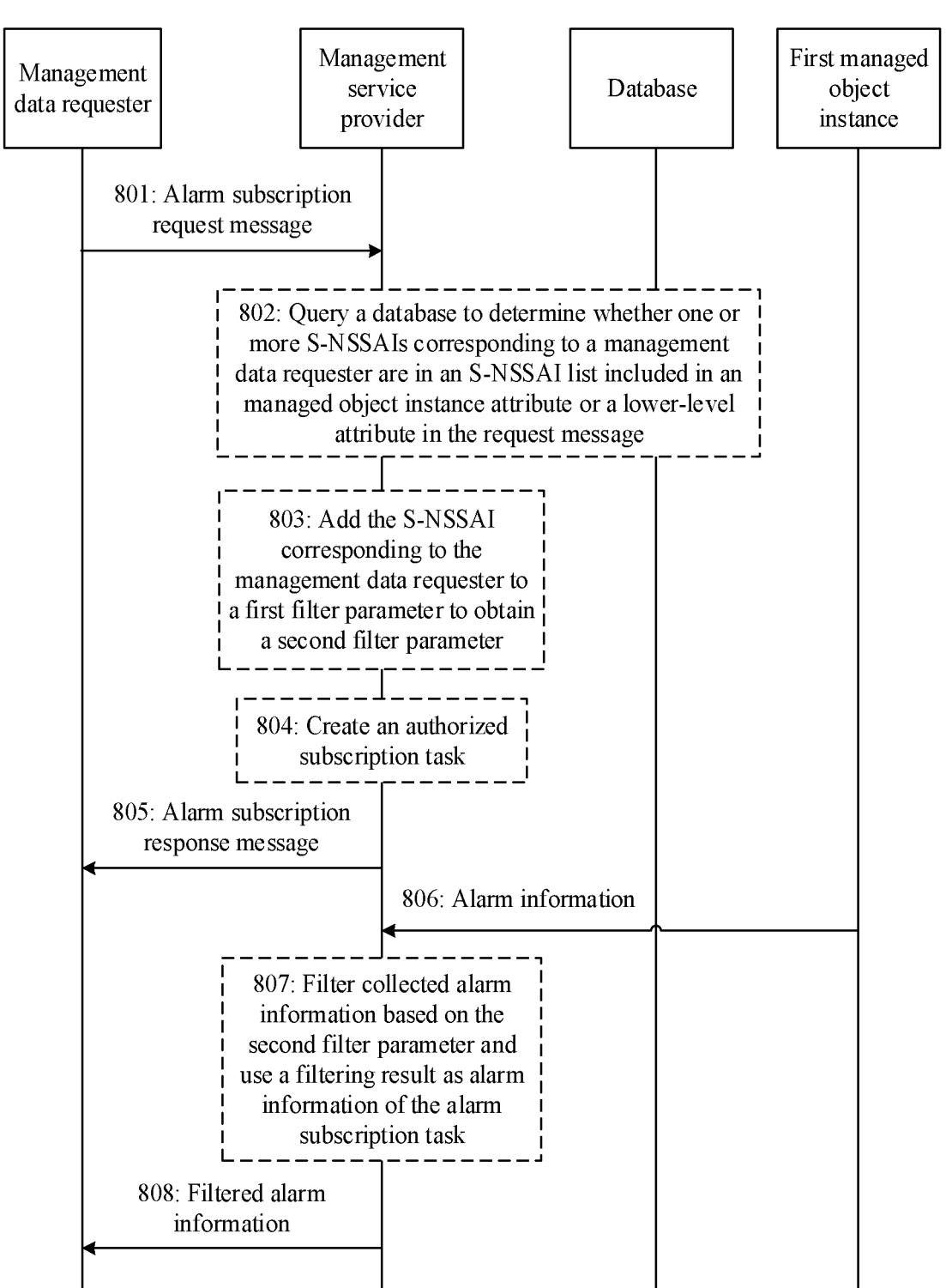
FIG. 8 is a schematic flowchart of another method for obtaining management data according to this disclosure.

As shown in FIG. 8, FIG. 8 is a schematic flowchart of still another method for obtaining management data according to this disclosure. As a management data requester, the tenant 2 in FIG. 4 sends, to a management service provider in an operator network management system, a request message for subscribing to alarm information of a UPF, and expects to obtain alarm information of a UPF2, a UPF3, and a UPF4 in FIG. 4. A process of performing identity authentication on the management data requester is similar to that in the embodiment in FIG. 7, and details are not described again.

The method includes the following steps.

Step 801: The management service provider receives an alarm subscription request message from the management data requester.

The alarm subscription request message carries the following content: an identifier of the tenant 2 (e.g., S-NSSAI #2); managed object instance(s) (e.g., MOIs of the UPF2, the UPF3, and the UPF4); and first filter parameter, e.g., an event type (eventType), which is equal to Communications Alarm.

Step 802: The management service provider queries a database to determine whether one or more S-NSSAIs corresponding to the management data requester are in an S-NSSAI list included in a managed object instance attribute or a lower-level attribute in the request message.

For example, the S-NSSAI #2 corresponding to the management data requester is in sNSSAIList attributes of the UPF2 and the UPF3, but is not in an sNSSAIList attribute of the UPF4. If the S-NSSAI corresponding to the management data requester is not in the sNSSAIList attribute of a managed object instance, it is determined that the management data requester does not have permission to obtain management data of the managed object instance, and the managed object instance is removed from an alarm subscription task to be created. If the management data requester does not have permission to obtain management data of all managed object instances, step 805 is directly performed, and a subscription task creation failure message is returned to the management data requester, where the message carries an unauthorized managed object instance (for example, the UPF4). Otherwise, step 803 continues to be performed, to prepare an alarm subscription task to be created for a managed object instance, for example, the UPF2 and the UPF3, for which the requester has permission to obtain management data.

Step 803: The management service provider adds the S-NSSAI corresponding to the management data requester to the first filter parameter to obtain a second filter parameter, where the second filter parameter is: eventType is equal to Communications Alarm and object Instance is equal to the S-NSSAI #2, and uses the second filter parameter as a filter for the alarm information subscription task to be created.

In this embodiment, the second filter parameter includes the S-NSSAI #2.

Step 804: The management service provider creates the alarm subscription task, and records a subscription identifier of the task.

Step 805: The management service provider returns an alarm subscription response message to the management data requester. If the task is created successfully, the message carries the subscription identifier. Otherwise, a subscription failure message is returned.

Step 806: The management service provider collects alarm and event information generated by the managed object instance.

For example, refer to FIG. 4. If the UPF4 is congested due to overload, a network slice communication service identified by S-NSSAI #3 is affected. The UPF2 is overloaded and generates a packet loss alarm due to reverse pressure of congested traffic destined for a DN3, and the network slice communication service identified by the S-NSSAI #3 is affected. In addition, a processing delay of a network slice communication service identified by the S-NSSAI #2 increases due to overload of the UPF2, and exceeds a threshold. Therefore, the UPF2 generates alarm information indicating that the processing delay exceeds the threshold.

Step 807: The management service provider filters the collected alarm information based on the second filter parameter, and uses a filtering result as alarm information of the alarm subscription task.

For example, the management service provider uses the second filter parameter to filter the alarm information collected in step 806, and a congestion alarm of the UPF4 is filtered out. Information about the packet loss alarm of the UPF2 is also filtered out because it contains only the S-NSSAI #3 and does not contain the S-NSSAI #2. Only an alarm indicating that the processing delay of the UPF2 exceeds the threshold is retained in the filtered result as the alarm information of the alarm subscription task because the alarm contains the S-NSSAI #2.

Step 808: The management service provider sends, according to the alarm subscription task, the filtered alarm information to the management data requester that subscribes to the alarm information, where the alarm information carries the subscription identifier and the alarm information of the subscription task. The alarm information is the filtered alarm information.

It should be noted that the management data requester may also use a manner similar to that in the embodiment in FIG. 5A and FIG. 5B instead of using the S-NSSAI as a tenant identifier, or use a plurality of pieces of S-NSSAIs as the tenant identifier. In this way, the management service provider may obtain the plurality of pieces of S-NSSAIs corresponding to the management data requester, use the plurality of pieces of S-NSSAIs to check permission of the management data requester on the managed object instance, remove an unauthorized managed object, and add the plurality of pieces of S-NSSAIs corresponding to the requester to the first filter parameter to obtain the second filter parameter. For example, when a tenant 3 serving as the management data requester requests to subscribe to alarm information, if the tenant 3 subscribes to network slice communication services identified by the S-NSSAI #3 and S-NSSAI #4, a finally updated second filter parameter of a subscription task includes the S-NSSAI #3 and/or the S-NSSAI #4.

It should be noted that, in an alternative implementation, the alarm subscription request message in step 801 may also be replaced with a request message for obtaining an alarm information list, and the alarm subscription response message in step 805 is replaced with an alarm response message.

In this case, step 804 does not need to be performed. In addition, step 806 is replaced with that the management service provider actively obtains the alarm information list from a first managed object instance. Step 807 is replaced with filtering collected alarm information list based on the second filter parameter, to obtain a filtered alarm information list. Step 808 is replaced with that the management service provider sends the filtered alarm information list to the management data requester. A main difference between the alternative implementation and the embodiment in FIG. 8 lies in that: The alternative implementation actively requests to query and obtain the alarm information list, while the embodiment in FIG. 8 obtains the alarm information through subscription.

According to the foregoing embodiment, whether the management data requester is authorized to obtain the alarm event information of the managed object instance can be automatically verified, and a range of the authorized management data (that is, which alarm event information related to a network slice) can be determined. Alarm information of a network slice that is not subscribed by the management data requester can be automatically filtered out from the management data. Therefore, the alarm event information can be exposed to a third party within a proper permission range. Whether the management data requester has permission to obtain the management data of the managed object is determined based on whether the S-NSSAI corresponding to the management data requester is included in the managed object instance attribute. The filter parameter is added to the alarm subscription task based on the S-NSSAI corresponding to the tenant and the S-NSSAI subscribed by the tenant is added to a filtering condition. The alarm event information is reported to the management data requester based on a result obtained after the filtering based on the filtering condition, and the alarm information of the network slice that is not subscribed by the management data requester is filtered out from the management data.

The foregoing mainly describes the solutions provided in this disclosure from a perspective of interaction between network elements. It may be understood that the network elements include corresponding hardware structures and/or software modules for performing the foregoing functions. A person skilled in the art should be aware that, in combination with the examples described in the embodiments of units and algorithm steps disclosed in this specification, this disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 9:
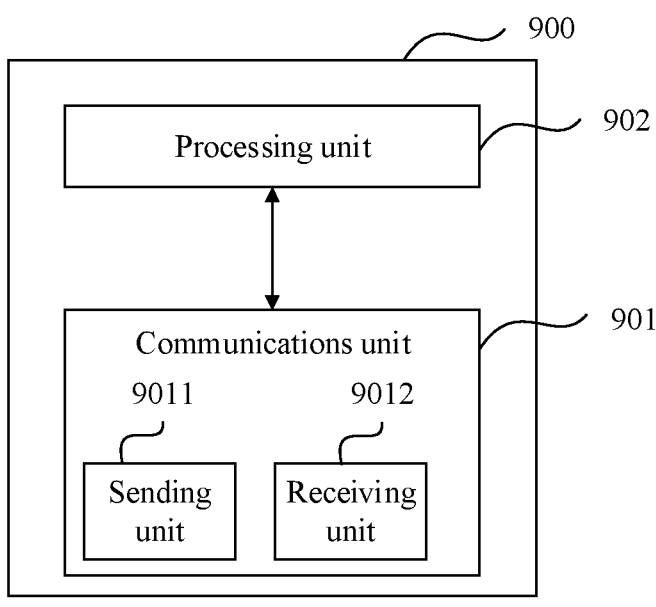
FIG. 9 is a schematic diagram of an apparatus for obtaining management data according to this disclosure.

FIG. 9 is a possible example block diagram of an apparatus 900 for obtaining management data according to this disclosure, and the apparatus 900 may exist in a form of software or hardware. The apparatus 900 may include a processing unit 902 and a communications unit 901. In an implementation, the communications unit 901 may include a receiving unit 9012 and a sending unit 9011. The processing unit 902 is configured to control and manage an action of the apparatus 900. The communications unit 901 is configured to support the apparatus 900 to communicate with another network entity.

The processing unit 902 may be a processor or a controller, for example, may be a central processing unit (CPU), a general purpose processor, a digital signal processor (DSP), an application specific integrated circuit (ASIC), a field-programmable gate array (FPGA), or another programmable logic device, a transistor logic device, a hardware component, or any combination thereof. The processor 902 may implement or perform various example logical blocks, modules, and circuits described with reference to content disclosed in this disclosure. The processor 902 may be a combination of implementing a computing function, for example, a combination of one or more microprocessors or a combination of the DSP and a microprocessor. The communications unit 901 is an interface circuit of the apparatus 900, and is configured to receive a signal from another apparatus. For example, when the apparatus 900 is implemented as a chip, the communications unit 901 is an interface circuit, of the chip, that is configured to receive a signal from another chip or apparatus, or the communications unit 901 is an interface circuit, of the chip, that is configured to send a signal to another chip or apparatus.

The apparatus 900 may be the first network element or the second network element in the foregoing embodiment, or may be a chip used in the first network element or the second network element. For example, when the apparatus 900 is the first network element or the second network element, the processing unit 902 may be, for example, a processor, and the communications unit 901 may be, for example, a transceiver. Optionally, the transceiver may include a radio frequency circuit, and a storage unit may be, for example, a memory. For example, when the apparatus 900 is a chip used in the first network element or the second network element, the processing unit 902 may be, for example, a processor, and the communications unit 901 may be, for example, an input/output interface, a pin, or a circuit. The processing unit 902 may perform a computer executable instruction stored in the storage unit. Optionally, the storage unit is a storage unit in the chip, such as a register or a cache. The storage unit may be a storage unit that is in the first network element or the second network element and that is located outside the chip, for example, a read-only memory (ROM) or another type of static storage device that can store static information and an instruction, or a random access memory (RAM).

In a first embodiment, the apparatus 900 is the first network element in the foregoing embodiment. The communications unit 901 is configured to receive a request message from a second network element, where the request message indicates a tenant identifier and at least one managed object instance, and where the tenant identifier corresponds to at least one network slice service identifier.

The processing unit 902 is configured to determine a first managed object instance in the at least one managed object instance based on the network slice service identifier, where the second network element has permission to obtain management data of the first managed object instance. The communications unit 901 is further configured to obtain management data corresponding to the network slice service identifier from the first managed object instance, and send the management data to the second network element.

In a possible implementation method, the processing unit 902 is configured to: for any one managed object instance in the at least one managed object instance, if determining that an attribute of the any one managed object instance includes the network slice service identifier, determine that the any one managed object instance is the first managed object instance.

In a possible implementation method, the communications unit 901 is further configured to obtain the attribute of each managed object instance in the at least one managed object instance from a database.

In a possible implementation method, the tenant identifier is the at least one network slice service identifier. Alternatively, the communications unit 901 is further configured to obtain the at least one network slice service identifier corresponding to the tenant identifier based on the tenant identifier from a third network element, where the third network element is the first network element, the second network element, or the database.

In a possible implementation method, the at least one managed object instance includes one or more of the following items: a network function, a network slice instance, or a subnet slice instance.

In a possible implementation method, the request message includes the tenant identifier and information of the at least one managed object instance, and the request message is used to request to create a performance measurement task. The processing unit 902 is further configured to set a measurement sub-item for the performance measurement task corresponding to the first managed object instance based on the network slice service identifier, and create the performance measurement task. The communication unit 901 is configured to receive a performance measurement result corresponding to the performance measurement task from the first managed object instance, where the performance measurement result is management data of the measurement sub-item.

In a possible implementation method, the communications unit 901 is further configured to send a response message to the second network element, where the response message includes an identifier of the created performance measurement task and a second managed object instance in the at least one managed object instance, and where the second network element does not have permission to obtain management data of the second managed object instance.

In a possible implementation method, the request message is used to request to create an alarm information subscription task, the request message further indicates a first filter parameter, and the first filter parameter is used to determine alarm information of the at least one managed object instance. The processing unit 902 is further configured to determine a second filter parameter based on the network slice service identifier and the first filter parameter, and create the alarm information subscription task, where the alarm information subscription task corresponds to the second filter parameter, and where the second filter parameter is used to obtain alarm information corresponding to the network slice service identifier in the first managed object instance. The communications unit 901 is configured to receive the alarm information corresponding to the alarm information subscription task from the first managed object instance, and the alarm information is the management data.

In a possible implementation method, the request message is used to request to query alarm information, the request message further indicates a first filter parameter, and the first filter parameter is used to determine alarm information of the at least one managed object instance. The processing unit 902 is further configured to determine a second filter parameter based on the network slice service identifier and the first filter parameter. The communications unit 901 is configured to obtain alarm information corresponding to the network slice service identifier from the first managed object instance based on the second filter parameter, and the alarm information is the management data.

In a possible implementation method, the processing unit 902 is configured to add the network slice service identifier to the first filter parameter, to obtain the second filter parameter.

In a second embodiment, the apparatus 900 is the second network element in the foregoing embodiment. The sending unit 9011 is configured to send a request message to a first network element, where the request message indicates a tenant identifier and at least one managed object instance, and the tenant identifier corresponds to at least one network slice service identifier. The receiving unit 9012 is configured to receive management data of a network slice service corresponding to the network slice service identifier in a first managed object instance from the first network element. The apparatus 900 has permission to obtain the management data in the first managed object instance, the first managed object instance is a managed object instance in the at least one managed object instance, and an attribute of the first managed object instance includes the network slice service identifier.

In a possible implementation method, the tenant identifier is the at least one network slice service identifier. Alternatively, the sending unit 9011 is further configured to send the at least one network slice service identifier to the first network element.

In a possible implementation method, the at least one managed object instance includes one or more of the following items: a network function, a network slice instance, or a subnet slice instance.

In a possible implementation method, the request message includes the tenant identifier and information of the at least one managed object instance, and the request message is used to request to create a performance measurement task. The receiving unit 9012 is configured to receive a performance measurement result from the first network element, where the performance measurement result is the management data.

In a possible implementation method, the receiving unit 9012 is further configured to receive a response message from the first network element, where the response message includes an identifier of the created performance measurement task and a second managed object instance in the at least one managed object instance, and where the apparatus does not have permission to obtain management data of the second managed object instance.

It should be noted that, for an implementation process and a corresponding beneficial effect of the apparatus 900 when the apparatus 900 is used for the foregoing method for obtaining management data, reference may be made to related descriptions in the foregoing method embodiments, and details are not described herein again.

If the apparatus 900 is a first network element or a second network element, the first network element or the second network element is presented in a form of functional modules obtained through integration. The "module" herein may refer to an ASIC, a circuit, a processor and a memory that execute one or more software or firmware programs, an integrated logic circuit, and/or another component that can provide the foregoing functions. In an embodiment, a person skilled in the art may figure out that the first network element and the second network element may be in a form shown in FIG. 10.

Figure 10:
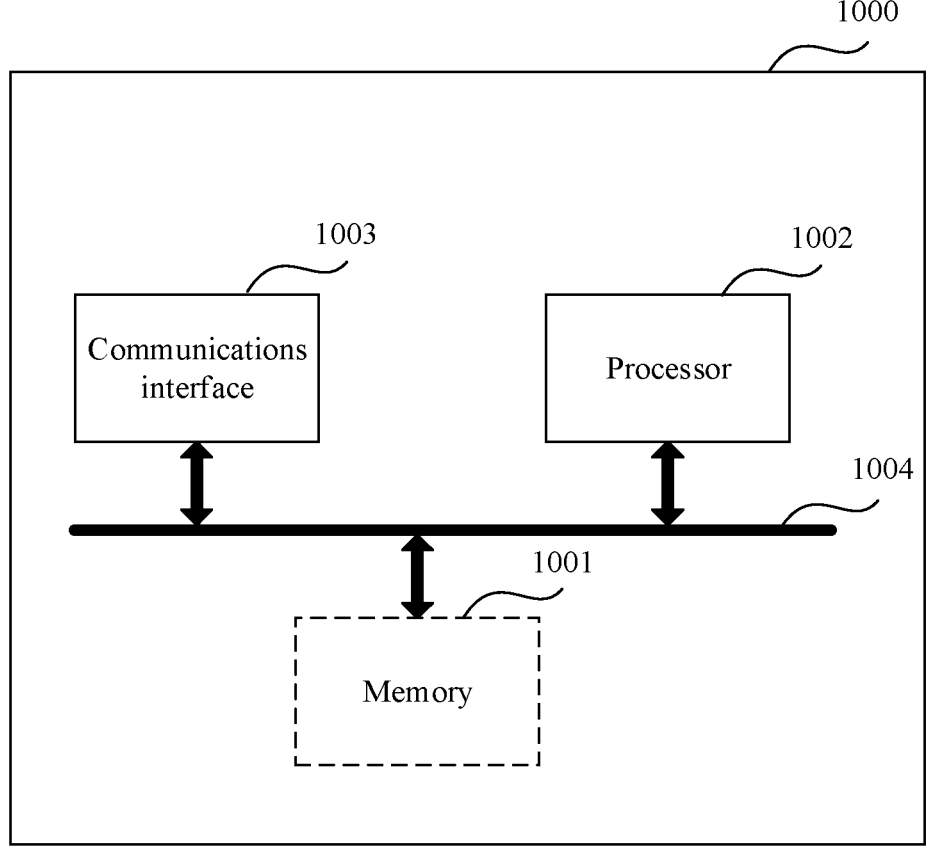
FIG. 10 is a schematic diagram of another apparatus for obtaining management data according to this disclosure.

For example, a processor 1002 in FIG. 10 may invoke a computer executable instruction stored in a memory 1001, to enable a first network element or a second network element performs the method in the foregoing method embodiment.

For example, the function/implementation process of the communications unit 901 and the processing unit 902 in FIG. 9 may be implemented by the processor 1002 in FIG. 10 by invoking the computer executable instruction stored in the memory 1001. Alternatively, the function/implementation process of the processing unit in FIG. 9 may be implemented by the processor 1002 in FIG. 10 by invoking the computer executable instruction stored in the memory 1001, and the function/implementation process of the communications unit in FIG. 9 may be implemented through a communications interface 1003 in FIG. 10.

Optionally, when the apparatus 1000 is a chip or a circuit, the function/implementation process of the communications unit 1001 may alternatively be implemented through a pin, a circuit, or the like.

FIG. 10 is a schematic diagram of still another apparatus 1000 for obtaining management data according to this disclosure. The apparatus 1000 may be the first network element or the second network element in the foregoing embodiment. The apparatus 1000 includes the processor 1002 and the communications interface 1003. Optionally, the apparatus 1000 may further include the memory 1001. Optionally, the apparatus 1000 may further include a communications line 1004. The communications interface 1003, the processor 1002, and the memory 1001 may be connected to each other through the communications line 1004. The communications line 1004 may be a peripheral component interconnect (PCI for short) bus, an extended industry standard architecture (EISA for short) bus, or the like. The communications line 1004 may be classified into an address bus, a data bus, a control bus, and the like. For ease of representation, only one thick line is used to represent the bus in FIG. 10, but this does not mean that there is only one bus or only one type of bus.

The processor 1002 may be a CPU, a microprocessor, an ASIC, or one or more integrated circuits configured to control program execution in the solutions of this disclosure.

The communications interface 1003 uses any apparatus like a transceiver, and is configured to communicate with another device or communications network, such as the Ethernet, a radio access network (RAN), a wireless local area network (WLAN), or a wired access network.

The memory 1001 may be a ROM, another type of static storage device that can store static information and an instruction, a RAM, or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, it is not limited thereto. The memory 1001 may exist independently, and is connected to the processor through the communications line 1004. The memory 1001 may be integrated with the processor 1002.

The memory 1001 is configured to store the computer executable instruction for performing the solutions in this disclosure, and the processor 1002 controls the execution. The processor 1002 is configured to perform the computer executable instruction stored in the memory 1001, to implement a method for obtaining management data provided in the following embodiments of this disclosure.

Optionally, the computer executable instruction in this embodiment of this disclosure may also be referred as application program code. This is not specifically limited in this embodiment of this disclosure.

A person of ordinary skill in the art may understand that various reference numerals such as "first" and "second" in this disclosure are merely used for differentiation for ease of description, and are not used to limit a scope of the embodiments of this disclosure, or represent a sequence. The term "and/or" describes an association relationship of associated objects, and represents that three relationships may exist. For example, A and/or B may represent the following three cases: only A exists, both A and B exist, and only B exists. The character "/" generally indicates an "or" relationship between the associated objects "At least one" means one or more. "At least two" means two or more. "At least one", "any one", or a similar expression thereof means any combination of these items, including any combination of a single item (piece) or a plurality of items (pieces). For example, at least one (piece, or type) of a, b, or c may indicate: a, b, c, a-b, a-c, b-c, or a-b-c, where a, b, and c may be singular or plural. "A plurality of" means two or more, and another quantifier is similar to this. In addition, an element that appears in singular forms "a", "an", and "the" does not mean "one or only one" unless otherwise specified in the context, but means "one or more". For example, "a device" means one or more such devices.

All or some of the foregoing embodiments may be implemented through software, hardware, firmware, or any combination thereof. When software is used to implement the embodiments, some or all of the embodiments may be implemented in a form of a computer program product. The computer program product includes one or more computer instructions. When the computer program instructions are loaded and performed on a computer, the procedure or function according to the embodiments of this disclosure are all or partially generated. The computer may be a general-purpose computer, a special-purpose computer, a computer network, or another programmable apparatuses. The computer instructions may be stored in a computer-readable storage medium or may be transmitted from a computer-readable storage medium to another computer-readable storage medium. For example, the computer instructions may be transmitted from a website, computer, server or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk or solid state drive (SSD)), or the like.

The various illustrative logical units and circuits described in the embodiments of this disclosure may implement or operate the described functions through a general purpose processor, a digital signal processor, an application specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may alternatively be any conventional processor, controller, microcontroller, or state machine. The processor may also be implemented by a combination of computing apparatus, such as a digital signal processor and a microprocessor, a plurality of microprocessors, one or more microprocessors in combination with a digital signal processor core, or any other similar configuration.

The methods or steps of algorithms described in the embodiments of this disclosure may be directly embedded into hardware, a software unit performed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, such that the processor may read information from the storage medium and write information to the storage medium. Optionally, the storage medium may be further integrated into the processor. The processor and the storage medium may reside in an ASIC.

The computer program instructions may alternatively be loaded onto a computer or another programmable data processing device, such that a series of operations and steps are performed on the computer or the other programmable device, to generate computer-implemented processing. Therefore, the instructions executed on the computer or another programmable device provide steps for implementing a function in one or more procedures in the flowcharts and/or in one or more blocks in the block diagrams.

Although this disclosure is described with reference to example features and the embodiments thereof, definitely, various modifications and combinations may be made to them without departing from the spirit and scope of this disclosure. Correspondingly, the specification and accompanying drawings are merely example description of this disclosure defined by the accompanying claims, and is considered as any of or all modifications, variations, combinations or equivalents that cover the scope of this disclosure. Of course, various modifications and variations can be made to this disclosure without departing from the scope of this disclosure. In this way, this disclosure is intended to cover these modifications and variations of this disclosure provided that they fall within the scope of the claims of this disclosure and their equivalent technologies.

What is claimed is:

1. A method for obtaining management data, comprising:
receiving, by a first network element, a request message from a second network element, wherein the request message indicates a tenant identifier and at least one managed object instance, wherein the tenant identifier corresponds to at least one network slice service identifier, and wherein the at least one managed object instance comprises one or more of a network function, a network slice identifier, or a subnet slice instance;
determining, for each managed object instance in the at least one managed object instance, an attribute of each managed object instance;
obtaining, by the first network element from each managed object instance whose attribute comprises the network slice service identifier, managed data corresponding to a network slice service identifier in the at least one network slice service identifier; and
sending, by the first network element, the managed data to the second network element.

2. The method according to claim 1, further comprising obtaining, by the first network element, the attribute of each managed object instance in the at least one managed object instance from a database.

3. The method according to claim 1, wherein the tenant identifier is the at least one network slice service identifier.

4. The method according to claim 1, wherein the request message comprises the tenant identifier and information of the at least one managed object instance, wherein the request message requests creating a performance measurement task corresponding to a first managed object in the at least one managed object instance, and wherein obtaining the managed data comprises:
setting, by the first network element, a measurement sub-item for the performance measurement task based on the network slice service identifier;
creating the performance measurement task; and
receiving, by the first network element from each managed object instance, a performance measurement result corresponding to the performance measurement task, wherein the performance measurement result includes first management data of the measurement sub-item.

5. The method according to claim 1, wherein the request message requests creating an alarm information subscription task, wherein the request message further indicates a first filter parameter to determine alarm information of the at least one managed object instance, and wherein obtaining the managed data comprises:
determining, by the first network element, a second filter parameter based on the network slice service identifier and the first filter parameter;
creating the alarm information subscription task, wherein the alarm information subscription task corresponds to the second filter parameter, and wherein the second filter parameter is for obtaining, from a first managed object instance in the at least one managed object instance, first alarm information corresponding to the alarm information subscription task and the network slice service identifier in the at least one network slice service identifier; and
receiving, by the first network element from the first managed object instance, the first alarm information corresponding to the alarm information subscription task, wherein the first alarm information includes the managed data.

6. The method according to claim 5, wherein determining the second filter parameter comprises adding, by the first network element, the network slice service identifier to the first filter parameter to obtain the second filter parameter.

7. The method according to claim 1, wherein the request message requests to query for alarm information, wherein the request message further indicates a first filter parameter to determine first alarm information of the at least one managed object instance, and wherein obtaining the managed data comprises:
determining, by the first network element, a second filter parameter based on the network slice service identifier and the first filter parameter; and
obtaining, by the first network element from each managed object instance, the first alarm information based on the second filter parameter, wherein the first alarm information corresponds to the network slice service identifier in the at least one network slice service identifier, and wherein the first alarm information includes the managed data.

8. The method according to claim 1, wherein the method further comprises obtaining, by the first network element, the at least one network slice service identifier from a third network element, and wherein the third network element is the first network element, the second network element, or a database.

9. An apparatus for obtaining management data, comprising:

a processor; and a memory coupled to the processor and configured to store instructions executable by the processor to:

receive a request message from a second network element, wherein the request message indicates a tenant identifier and at least one managed object instance, wherein the tenant identifier corresponds to at least one network slice service identifier, and wherein the at least one managed object instance comprises one or more of a network function, a network slice identifier, or a subnet slice instance;

determine an attribute for each managed object instance in the at least one managed object instance;

obtain, from each managed object instance whose attribute comprises the least one network slice service identifier, managed data corresponding to a network slice service identifier in the at least one network slice service identifier; and send the managed data to the second network element.

10. The apparatus according to claim 9, wherein the processor is further configured to obtain the attribute of each managed object instance from a database.

11. The apparatus according to claim 9, wherein the tenant identifier is the at least one network slice service identifier.

12. The apparatus according to claim 9, wherein the request message comprises the tenant identifier and information of the at least one managed object instance, wherein the request message requests creating a performance measurement task corresponding to a first managed object instance in the at least one managed object instance, and wherein the processor is further configured to:

set a measurement sub-item for the performance measurement task based on the network slice service identifier in the at least one network slice service identifier;

create the performance measurement task; and receive, from each managed object instance, a performance measurement result corresponding to the performance measurement task, wherein the performance measurement result includes first management data of the measurement sub-item.

13. The apparatus according to claim 9, wherein the request message requests to create an alarm information subscription task, wherein the request message further indicates a first filter parameter to determine alarm information of the at least one managed object instance, and wherein the processor is further configured to:

determine a second filter parameter based on the network slice service identifier and the first filter parameter;

create the alarm information subscription task, wherein the alarm information subscription task corresponds to the second filter parameter, and wherein the second filter parameter is to obtain, from a first managed object instance in the at least one managed object instance, first alarm information corresponding to the network slice service identifier in the at least one network slice service identifier; and receive the first alarm information from the first managed object instance, wherein the first alarm information includes the management data.

14. The apparatus according to claim 13, wherein the processor is configured to obtain the second filter parameter by adding the network slice service identifier to the first filter parameter.

15. The apparatus according to claim 9, wherein the request message requests to query for an alarm information subscription task, wherein the request message further indicates a first filter parameter to determine alarm information of the at least one managed object instance, and wherein the processor is further configured to:

determine a second filter parameter based on the network slice service identifier and the first filter parameter; and obtain, based on the second filter parameter, first alarm information from each managed object instance, wherein the first alarm information corresponds to the network slice service identifier in the at least one network slice service identifier, and wherein first the alarm information includes the managed data.

16. The apparatus according to claim 9, wherein the tenant identifier is the at least one network slice service identifier.

17. A system for obtaining management data, comprising:

a second network element configured to send a request message to a first network element, wherein the request message indicates a tenant identifier and at least one managed object instance, wherein the tenant identifier corresponds to at least one network slice service identifier, and wherein the at least one managed object instance comprises one or more of a network function, a network slice identifier, or a subnet slice instance;

the first network element is configured to:

receive the request message;

determine, for each managed object instance in the at least one managed object instance, an attribute of each managed object instance;

obtain, from each managed object instance whose attribute comprises the network slice service identifier, managed data corresponding to a network slice service identifier in the at least one network slice service identifier; and send the managed data to the second network element, and wherein the second network element is further configured to receive the management data.

18. The system according to claim 17, wherein the tenant identifier is the at least one network slice service identifier.

19. The system according to claim 17, wherein the request message comprises the tenant identifier and information of the at least one managed object instance, wherein the request message requests creating a performance measurement task, and wherein the management data is included in a performance measurement result.

20. The system according to claim 17, wherein the tenant identifier is the at least one network slice service identifier.

* * * * *